(12) United States Patent
Nakamura et al.

(10) Patent No.: US 8,881,354 B2
(45) Date of Patent: Nov. 11, 2014

(54) TOOL RADIUS ADJUSTING SYSTEM FOR BORING HOLDER, TOOL RADIUS ADJUSTING METHOD IN MACHINE TOOL, AND MACHINE TOOL

(75) Inventors: Eiji Nakamura, Nagoya (JP); Norikazu Sawaki, Chiryu (JP); Akihiko Kadota, Chiryu (JP); Takashi Yokoyama, Seto (JP)

(73) Assignee: JTEKT Corporation, Osaka-shi (JP)

( * ) Notice: Subject to any disclaimer, the term of this patent is extended or adjusted under 35 U.S.C. 154(b) by 1032 days.

(21) Appl. No.: 12/942,433

(22) Filed: Nov. 9, 2010

(65) Prior Publication Data
US 2011/0116880 A1 May 19, 2011

(30) Foreign Application Priority Data

Nov. 16, 2009 (JP) ................................. 2009-261394
Nov. 16, 2009 (JP) ................................. 2009-261401

(51) Int. Cl.
*B23B 29/034* (2006.01)
(52) U.S. Cl.
CPC ....... *B12Q 17/2457* (2013.01); *B23B 2260/092* (2013.01); *B23B 2270/027* (2013.01); *B23B 2270/48* (2013.01); *B23B 2270/025* (2013.01); *B23B 29/03425* (2013.01); *B23B 2250/04* (2013.01); *B23B 29/03421* (2013.01)
USPC .............. 29/26 R; 408/1 R; 408/13; 408/147; 408/153; 82/1.11
(58) Field of Classification Search
USPC ........... 29/26 A, 26 R; 408/1 R, 13, 147, 148, 408/149, 153; 82/1.11, 1.2, 1.4
See application file for complete search history.

(56) References Cited

U.S. PATENT DOCUMENTS

| 3,208,312 | A | * | 9/1965 | Heuser Helmut C ............. 82/1.2 |
| 3,715,167 | A | * | 2/1973 | Ollearo ......................... 408/149 |
| 4,009,968 | A | | 3/1977 | Vandenkieboon |
| 4,400,118 | A | | 8/1983 | Yamakage et al. |
| 4,447,177 | A | | 5/1984 | Ochiai et al. |

(Continued)

FOREIGN PATENT DOCUMENTS

| JP | 57-61407 | | 4/1982 |
| JP | 58028404 | A * | 2/1983 |

(Continued)

OTHER PUBLICATIONS

Combined Chinese Office Action and Search Report issued Feb. 12, 2014, in Chinese Patent Application No. 201010541848.7 with English translation of category of cited documents.

*Primary Examiner* — Daniel Howell
(74) *Attorney, Agent, or Firm* — Oblon, Spivak, McClelland, Maier & Neustadt, L.L.P.

(57) ABSTRACT

A boring holder in a tool radius adjusting system is provided with a cutting blade and fine and coarse motion adjusting mechanisms each capable of adjusting the position of the cutting blade relative to a rotational axis of the boring holder. The tool radius adjusting system is provided with a tool radius measuring device for measuring the tool radius of the boring holder and a controller configured to calculate a compensation amount based on a tool radius measured by the tool radius measuring device and a target tool radius and to operate the fine and coarse motion adjusting mechanisms based on the compensation amount so that the tool radius is brought into agreement with the target tool radius.

5 Claims, 11 Drawing Sheets

(56) References Cited

U.S. PATENT DOCUMENTS

| | | | |
|---|---|---|---|
| 4,486,130 A * | 12/1984 | Lipp | 408/181 |
| 4,551,044 A * | 11/1985 | Schultschik | 408/185 |
| 4,552,493 A * | 11/1985 | Schultshick | 408/3 |
| 4,581,808 A * | 4/1986 | Lawson et al. | 29/558 |
| 6,705,184 B2 * | 3/2004 | Cardemon et al. | 82/1.11 |
| 7,029,209 B2 * | 4/2006 | Cardemon et al. | 408/1 R |
| 7,272,877 B2 * | 9/2007 | Cardemon et al. | 29/26 A |

FOREIGN PATENT DOCUMENTS

| | | |
|---|---|---|
| JP | 2001-62613 | 3/2001 |
| JP | 2002-254274 | 9/2002 |
| JP | 2003-311517 | 11/2003 |
| JP | 2004-148481 | 5/2004 |
| JP | 3755411 B2 | 3/2006 |
| JP | 2007-283469 | 11/2007 |
| JP | 4216519 B2 | 1/2009 |

* cited by examiner

FIG. 17
FIG. 18
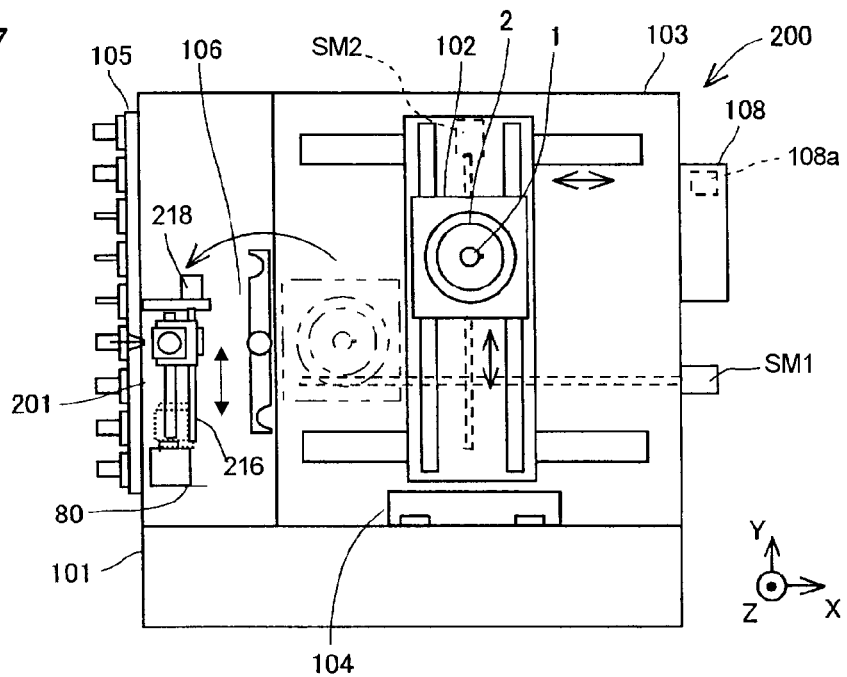
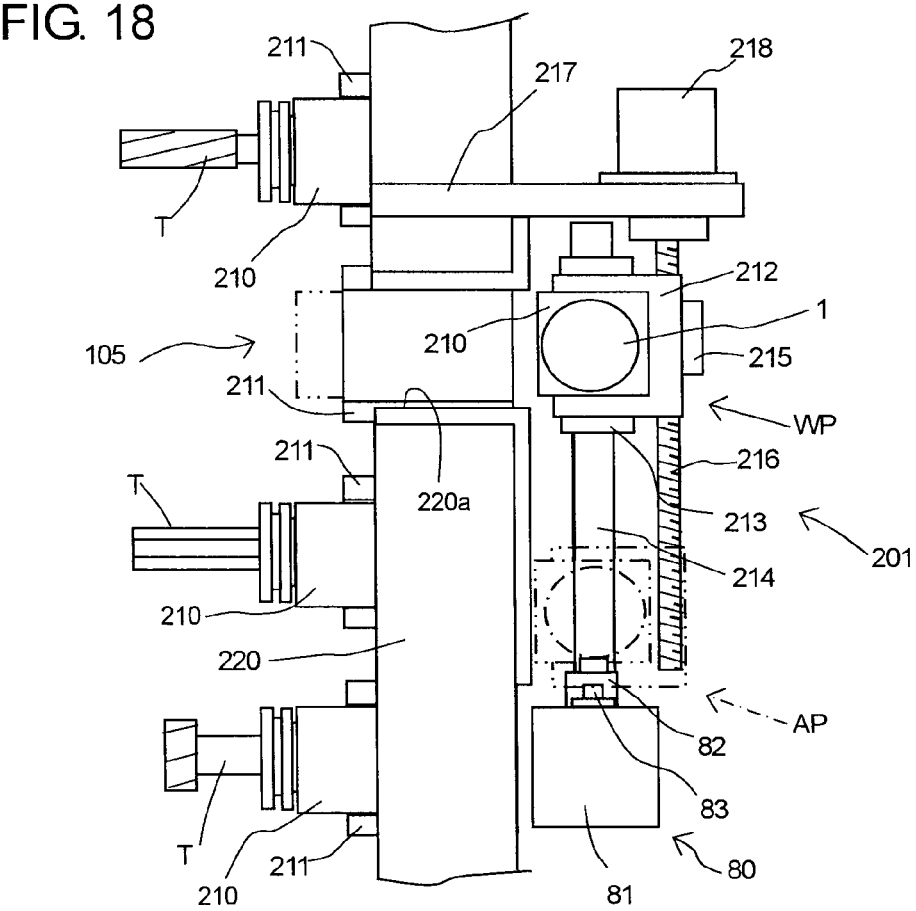

TOOL RADIUS ADJUSTING SYSTEM FOR BORING HOLDER, TOOL RADIUS ADJUSTING METHOD IN MACHINE TOOL, AND MACHINE TOOL

INCORPORATION BY REFERENCE

This application is based on and claims priority under 35 U.S.C. 119 with respect to Japanese patent applications No. 2009-261394 and No. 2009-261401 both filed on Nov. 16, 2009, the entire contents of which are incorporated herein by reference.

BACKGROUND OF THE INVENTION

1. Field of the Invention

The present invention relates to a tool radius adjusting system for a boring holder being adjustable in tool radius. The present invention also relates to a tool radius adjusting method in a machine tool with a boring holder being adjustable in tool radius, and further to a machine tool with a boring holder being adjustable in tool radius.

2. Discussion of the Related Art

Heretofore, as boring holders being adjustable in tool radius, there has been known one which is described in U.S. Pat. No. 4,400,118 (equivalent to JP57-61407 A) for example. It is described in the U.S. patent to measure the diameter of a bore in a machined workpiece and to compensate the tool radius of a boring holder based on the measured bore diameter. Further, it is described in JP2002-254274 A to measure a tool radius by utilizing laser beams.

As other boring holders being adjustable in tool radius, there have been known those described in JP2001-62613 A, JP2007-283469 A, JP2004-148481 A and JP2003-311517 A for example.

The boring holder described in the U.S. patent wherein the tool radius is compensated based on a measuring result has a one-step adjusting mechanism. Further, the boring holder described in JP2001-62613 A and incorporating a two-step adjusting mechanism is designed to adjust the tool radius by manually turning a dial nut and a coarse motion screw.

Furthermore, it has been desired to automatize adjusting the tool radius of a boring holder. As mentioned earlier, it has been known in the prior art to automatically adjust the tool radius by controlling the pressure of fluid.

SUMMARY OF THE INVENTION

It is an object of the present invention to provide a tool radius adjusting system for a boring holder capable of automatically compensating the tool radius in a boring holder with a two-step adjusting mechanism including a fine motion adjusting mechanism and a coarse motion adjusting mechanism.

Another object of the present invention is to provide a tool radius adjusting method in a machine tool and a machine tool both capable of automatically adjusting the tool radius in a new method different from the prior art automatic adjusting method.

Briefly, according to the present invention in a first aspect, there is provided a tool radius adjusting system for a boring holder. The system comprises a boring holder provided with a tool tip and also provided with a fine motion adjusting mechanism and a coarse motion adjusting mechanism each capable of adjusting the position of the tool tip relative to a rotational axis of the boring holder; a tool radius measuring device for measuring a tool radius of the boring holder; and a controller for calculating a compensation amount based on a tool radius measured by the tool radius measuring device and a target tool radius and for operating the fine motion adjusting mechanism and the coarse motion adjusting mechanism based on the compensation amount to make the tool radius agree with the target tool radius.

With this construction, it is possible to reliably perform an automatic compensation with respect to the boring holder having a two-step adjusting mechanism including the fine motion adjusting mechanism and the coarse motion adjusting mechanism. The fine motion adjusting mechanism and the coarse motion adjusting mechanism differ from each other in adjusting amount, wherein the adjusting amount by the coarse motion adjusting mechanism is set to be larger than the adjusting amount by the fine motion adjusting mechanism.

Also in the invention in the first aspect, the controller may determine one or both of the fine and coarse motion adjusting mechanisms to be operated, based on the compensation amount and may bring the tool radius into agreement with the target tool radius by operating the determined one or both of the adjusting mechanisms. Thus, it is possible to determine based on the compensation amount whether either one of the fine and coarse motion adjusting mechanisms is to be operated or whether both of the mechanisms are to be operated. Thus, it becomes possible to perform an appropriate operation based on the compensation amount.

According to the present invention in a second aspect, there is provided a tool radius adjusting method in a machine tool which comprises a boring holder provided with a housing and a movable body supported in the housing slidably relative to the housing in a direction intersecting a rotational axis of the boring holder, the movable body having a reference portion; a tool tip attached to the movable body; a holder support for supporting the boring holder in a tool standby area which is out of a machining area of the machine tool; a position adjusting reference member provided in the tool standby area and being contactable with the reference portion of the movable body; and a drive mechanism for effecting relative movement between the holder support and the position adjusting reference member. The method comprises a contact step of sliding the movable body relative to the housing to place the position of the tool tip at a predetermined position in a direction to go away from the rotational axis and of operating the drive mechanism to bring the reference portion of the movable body into contact with the position adjusting reference member with the tool tip placed at the predetermined position relative to the housing and an adjusting step of adjusting the position of the tool tip relative to the rotational axis by moving the relative position between the movable body and the position adjusting reference member in a direction to come close to each other after the contact step, wherein all of the steps are performed in the tool standby area.

With the construction in the second aspect, a reference state is first established in which the tool tip is positioned to the predetermined position in the direction to go away from the rotational axis and in which the reference portion of the movable body is in contact with the position adjusting reference member, and from the reference state, the relative position between the holder support and the position adjusting reference member is changed in the direction to come close to each other. Thus, the position of the tool tip relative to the rotational axis is adjusted by moving the position of the tool tip to come close to the rotational axis. In order to establish the reference state, the movable body is provided with the reference portion, and the position adjusting reference member is further provided. In this way, it is possible to adjust the tool radius of the boring holder automatically.

Further, the adjustment of the tool radius is performed in a tool waiting area or a non-machining area. The tool waiting area covers the place where a tool magazine and a tool exchange device are provided. Since the adjustment of the tool radius can be performed in such a tool waiting area (i.e., the tool standby area), it is possible to machine a workpiece with another tool attached to the tool spindle while the tool radius is being performed on the boring holder. In other words, it becomes possible to perform a tool radius adjustment of the boring holder being a next tool while a machining is being performed with another or preceding tool attached to the tool spindle. Accordingly, the tool radius adjustment of the boring holder can be done without extending the total period of time that is taken to machine a workpiece with a plurality of tools including the boring holder.

According to the present invention in a third aspect, there is provided a machine tool which comprises a boring holder provided with a housing and a movable body supported in the housing slidably in a direction intersecting a rotational axis of the boring holder, the movable body having a reference portion; a tool tip attached to the movable body; a holder support provided in a tool standby area where a tool in a state of being not attached to a tool spindle is on standby, for supporting the boring holder; a position adjusting reference member provided in the tool standby area and being contactable with the reference portion of the movable body; a drive mechanism provided in the tool standby area and being able to change the relative position between the holder support and the position adjusting reference member; and a controller for controlling the drive mechanism to control the relative position between the holder support and the position adjusting reference member. The controller is configured to adjust the position of the tool tip relative to the rotational axis by controlling the drive mechanism to change the relative position between the holder support and the position adjusting reference member in a direction to come close to each other in the state that the position of the tool tip is placed to a predetermined position in a direction to go away from the rotational axis and that the reference portion of the movable body is in contact with the position adjusting reference member.

With the construction in the third aspect, the machine tool can attain substantially the same effects as those in the foregoing tool radius adjusting method.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 17 is a front view of a machining center in a third embodiment, wherein a coarse motion adjusting unit is arranged differently from the first embodiment; and FIG. 18 is a fragmentary front view of a part of a tool magazine of the machining center, showing an adjustment-dedicated drive mechanism.

DETAILED DESCRIPTION OF THE PREFERRED EMBODIMENTS

Hereinafter, embodiments of a boring holder according to the present invention will be described with reference to the drawings.

First Embodiment

Construction of Boring Holder

Figure 1:
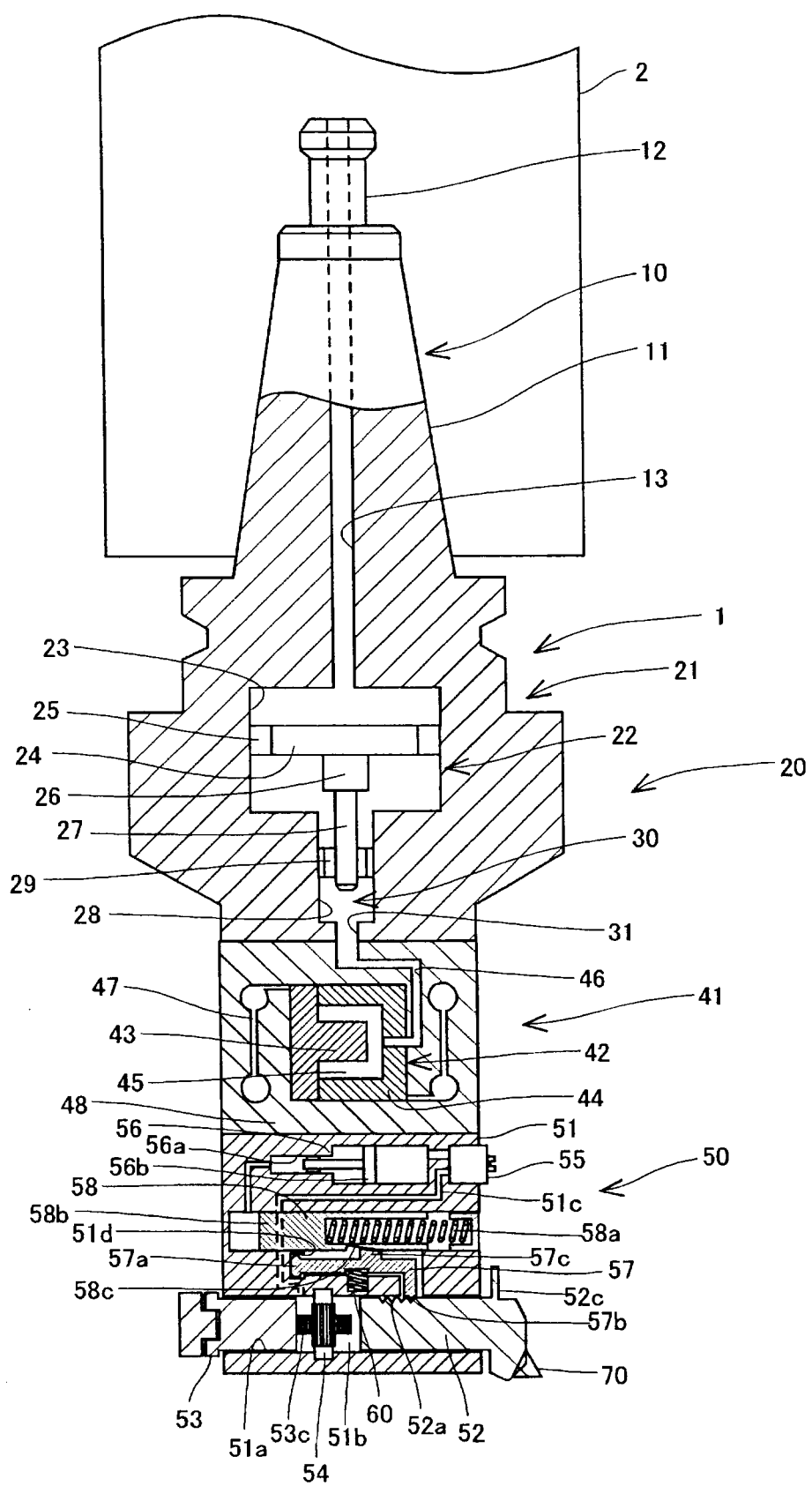
FIG. 1 is a longitudinal sectional view of a boring holder in a first embodiment according to the present invention.

The construction of a boring holder 1 in a first embodiment will be described with reference to FIGS. 1~3. As shown in FIG. 1, the boring holder 1 is a tool assembly which is held in a tool spindle 2 being rotatable about its axis for machining bores, recesses and the like in a workpiece, and is capable of adjusting its tool radius. In each of the figures, a tool spindle 2 side of the boring holder 1 will be referred to as base end or base end side, whereas a side with a cutting blade 70 thereon of the boring holder 1 will be referred to as distal end or distal end side.

The boring holder 1 is provided with a holder portion 10, a fine motion adjusting mechanism 20, a coarse motion adjusting mechanism 50, and the cutting blade 70. The holder portion 10, the fine motion adjusting mechanism 20 and the coarse motion adjusting mechanism 50 constitute a main body of the boring holder 1.

The holder portion 10 is provided with a taper shank portion 11 formed to a taper shape which becomes narrower toward the base end, and a pull stud 12 provided at an extreme base end of the taper shank portion 11. The taper shank portion 11 is inserted into a taper hole of the tool spindle 2, and the pull stud 12 is grasped by a collet (not shown) in the tool spindle 2. In this manner, the holder portion 10 is held in the tool spindle 2. Further, an air flow passage 13 extending in the axial direction is formed at the center of the taper shank portion 11. Air is supplied from the tool spindle 2 side to the air flow passage 13. The pressure of the air supplied from the tool spindle 2 side is controlled by a fluid control device (not shown).

The fine motion adjustment mechanism 20 is a device which is attached on a distal end of the holder portion 10 and which is capable of finely adjusting the position of the cutting blade 70 from the axis, that is, the tool radius. The fine motion adjusting mechanism 20 is provided with a base end body portion 21 (corresponding to "base portion" in the claimed invention) and an elastic deformation section 41.

The base end body portion 21 is bodily connected to a distal end of the holder portion 10 and is formed with an air-oil pressure transforming section 22 inside thereof. The air-oil pressure transforming section 22 is constructed as follows. A first cylinder 23 is formed in communication with an end side of the air flow passage 13 in the holder portion 10. In the first cylinder 23, a first piston 24 is received to be reciprocatively slidable in the axial direction (the vertical direction as viewed in FIG. 1) through a sliding seal 25. Further, the first piston 24 is connected at a distal end side thereof with a second piston 27 through a connecting rod 26. In a small-diameter second cylinder 28 which is in communication with the distal end side of the first cylinder 23, the second piston 27 is received to be reciprocatively slidable in the axial direction through a sliding seal 29.

An operating oil chamber 30 which is filled with operating oil is formed on a distal end side of the second piston 27. When an air pressure acts on the first piston 24 through the air flow passage 13 in the holder portion 10, the first piston 24 is moved toward the distal end side, and at the same time, the second piston 27 is moved toward the distal end side, whereby the oil pressure in the operating oil chamber 30 is increased. In this way, the air-oil pressure transforming section 22 transforms the air pressure supplied from the air flow passage 13 of the holder portion 10 into the oil pressure and increases the same. A communication passage 31 is formed in communication with the distal end side of the operating oil chamber 30.

The elastic deformation section 41 is constructed on a distal end of the base end body portion 21 as follows. A power unit 42 is provided inside the elastic deformation section 41. The power unit 42 is formed with an oil pressure chamber 45 between a convex block 43 and a concave block 44. The oil pressure chamber 45 and the communication passage 31 of the base end body portion 21 are in communication with each other through an oil passage 46 which is formed in a main body of the elastic deformation section 41 and the concave block 44. Further, an S-shaped slit 47 is formed in the elastic deformation section 41. When an oil pressure acts in the oil pressure chamber 45, a fine motion portion 48 on the distal end of the elastic deformation section 41 is deformed elastically to be shifted toward the left as viewed in FIG. 1 relative to a based end on the based end body portions 21 side of the elastic deformation section 41.

The coarse motion adjusting mechanism 50 is a device which is attached to a distal end of the fine motion adjusting mechanism 20 and which is capable of roughly adjusting the position of the cutting blade 70 from the axis of the holder portion 11, that is, the tool radius. The adjustable amount of the tool radius by the coarse motion adjusting mechanism 50 is greater than that by the fine motion adjusting mechanism 20. The coarse motion adjusting mechanism 50 is provided with a coarse motion housing 51, a coarse motion movable body 52, a counterweight 53, a pinion shaft 54, a fluid receiving port 55, an air-oil pressure transforming section 56, a clamping member 57 and an urging force generating section 58.

The coarse motion housing 51 is attached to the fine motion portion 48 of the elastic deformation section 41 in the fine motion adjusting mechanism 20. That is, when the fine motion portion 48 of the elastic deformation section 41 is shifted in a radial direction, the coarse motion housing 51 is shifted in the radial direction together with the shift motion of the fine motion portion 48.

The coarse motion movable body 52 is formed to take the shape of a generally round pillar. The coarse motion movable body 52 may be formed to take a square or rectangular pillar shape without being limited to such a round pillar. The cutting blade 70 is fixedly provided at an end side (a radially outer side of the boring holder 1) of the coarse motion movable body 52. On an external surface of the coarse motion movable body 52, a plurality (four in this particular embodiment) of grooves 52a which extend in a direction perpendicular to the center axis direction of the round pillar are arranged in a juxtaposed relation in the center axis direction of the round pillar. As one example, FIG. 2 shows the coarse motion movable body 52 with four grooves 52a. The grooves 52a are not required to be formed over the whole circumference of the round pillar and suffice to be formed within a predetermined angular range. The coarse motion movable body 52 so formed is reciprocatively slidably inserted into one opening side (the right side as viewed in FIG. 1) of a round hole 51a which is formed at a distal end side of the coarse motion housing 51 and which passes through the same in a radial direction. The moving amount (the coarse motion adjusting amount) in the radial direction of the coarse motion movable body 52 relative to the coarse motion housing 51 is greater than the fine motion adjusting amount of the fine motion portion 48 in the elastic deformation section 41 of the fine motion adjusting mechanism 20.

Further, the coarse motion movable body 52 is arranged to orient the grooves 52a on the external surface thereof upward as viewed in FIG. 1 (i.e., toward the base end side of the boring holder 1) and not to rotate about its round pillar axis. Further, a movable body rack portion 52b is bodily formed at a round shape base end portion of a coarse motion movable body 52 and extends in the axial direction of the round pillar. The movable body rack portion 52b constitutes a part of a rack-and-pinion mechanism and is in meshing with the pinion shaft 54 referred to later. That is, when the pinion shaft 54 is rotated, the coarse motion movable body 52 is moved in the left-right direction as viewed in FIG. 1.

Further, the coarse motion movable body 52 is provided on its distal end side with a reference portion 52c which protrudes toward the base end side of the boring holder 1. An outer surface of the reference portion 52c which surface extends radially of the boring holder 1 is formed to be a flat surface which has a normal line extending radially of the boring holder 1. The reference portion 52c is always at a position where it is exposed to the outside of the coarse motion housing 51. The reference portion 52c is used in making a coarse adjustment and is a member which is brought into contact with a position adjusting reference member 83 provided on a coarse motion adjusting unit 80 referred to later.

The counterweight 53 is for absorbing an imbalance weight which is built by an eccentric movement of the coarse motion movable body 52. Specifically, the shape and position of the counterweight 53 is set to have an inertia moment which is equivalent to an inertial moment generated by the coarse motion movable body 52 and the cutting blade 70. In this particular embodiment, the counterweight 53 is formed to take a generally round pillar as a whole and has a mass which is approximately the same as the mass of the coarse motion movable body 52.

The counterweight 53 incorporates therein a mechanism capable of adjusting its inertia moment. Specifically, the counterweight 53 is provided with a weight main body 53a and an adjustable weight 53b. The adjustable weight 53b is provided movably by means of, e.g., a screw or the like relative to the weight main body 53a in the sliding direction of the counterweight 53. That is, where the inertia moment including the coarse motion movable body 52 and the cutting blade 70 is changed by, for example, the replacement of the cutting blade 70, the counterweight 53 is able to have an inertia moment equivalent thereto as a whole by adjusting the position of the adjustable weight 53b relative to the weight main body 53a. The counterweight 53 is not limited to the round pillar shape and may be formed to, for example, a square or rectangular pillar.

The counterweight 53 is reciprocatively slidably inserted into the other opening side (the left side as viewed in FIG. 1) of the round hole 51a which is formed to radially pass through the distal end side of the coarse motion housing 51. The counterweight 53 is non-rotatably held by the coarse motion housing 51 not to turn about the round pillar axis. An weight rack portion 53c is bodily formed at a base end portion of the round pillar counterweight 53 and extends in the round pillar axis. The weight rack portion 53c constitutes another part of the rack-and-pinion mechanism and is in meshing with the pinion shaft 54 referred to later. Thus, when the pinion shaft 45 is rotated, the counterweight 53 is moved in the left-right direction as viewed in FIG. 1.

The pinion shaft 54 is supported at almost an axial center portion of the round hole 51a which is formed to radially pass through the distal end side of the coarse motion housing 51 and is rotatable about an axis parallel to the rotational axis of the coarse motion housing 51. The pinion shaft 54 is in meshing with the movable body rack portion 52b and the weight rack portion 53c. When the pinion shaft 54 is rotated counterclockwise as viewed in FIG. 3, the movable body rack portion 52b is moved toward the right as viewed in FIG. 3, in other words, the coarse motion movable body 52 is moved radially outward, while the weight rack portion 53c is moved toward the left as viewed in FIG. 3, in other words, the counterweight 53 is moved radially outward in a direction opposite to the moving direction of the coarse motion movable body 52. On the contrary, when the pinion shaft 54 is rotated clockwise, the movable body rack portion 52b is moved toward the left as viewed in FIG. 3, in other words, the coarse motion movable body 52 is moved radially inward, while the weight rack portion 53c is moved toward the right as viewed in FIG. 3, in other words, the counterweight 53 is moved radially inward in a direction opposite to the moving direction of the coarse motion movable body 52. That is, the rotation of the pinion shaft 54 causes the coarse motion movable body 52 and the counterweight 53 to move synchronously in opposite directions.

The fluid receiving port 55 is provided at a part of the outer surface on the base end of the coarse motion housing 51. The port 55 is able to be coupled to the coarse motion adjusting unit 80 which is outside the boring holder 1, and is configured to be supplied with pressurized air supplied from the coarse motion adjusting unit 80. Further, the port 55 has a first port and a second port. The first port is a port to supply air to an air residence chamber 51b referred to later, whereas the second port is a port to supply air to an air-oil pressure transforming section 56 referred to later.

In the coarse motion housing 51, the air residence chamber 51b is formed between the base end (an end portion being inside radially of the boring holder 1) of the coarse motion movable body 52 and the base end (an end portion being inside radially of the boring holder 1) of the counterweight 53. Between the air residence chamber 51b and the first port of the fluid receiving port 55, there is formed an air flow passage 51c which makes both of them communicate with each other. Thus, the coarse motion movable body 52 and the counterweight 53 are operated by the pressurized air supplied from the coarse motion adjusting unit 80 to the air residence chamber 51b. Specifically, when the pressurized air in the air residence chamber 51b is raised by being supplied from the coarse motion adjusting unit 80, the coarse motion movable body 52 is moved radially outward, so that the cutting blade 70 is moved in a direction to go away from the rotational axis. Simultaneously and synchronously with the movement of the coarse motion movable body 52, the counterweight 53 is slidden radially outward. The air supplied to the air residence chamber 51b is discharged gradually with the lapse of time through a slight clearance formed between the round hole 51a of the coarse motion housing 51 and the coarse motion movable body 52 and also through a slight clearance between the round hole 51a and the counterweight 53.

The air-oil pressure transforming section 56 is formed inside the coarse motion housing 51 and transforms into an oil pressure the air pressure which is supplied from the coarse motion adjusting unit 80 referred to later through the second port of the fluid receiving port 55. The transforming section 56 has a stepped cylinder 56a formed to extend radially inside of the coarse motion housing 51 and a piston 56b received in the stepped cylinder 56a to be slidable radially reciprocatively. The piston 56b has a large-diameter disc portion and a small-diameter rod portion. In the stepped cylinder 56a, a chamber on the right side as viewed in FIG. 2 of the large-diameter disc portion is supplied with pressurized air from the fluid receiving port 55. In the stepped cylinder 56a, the other chamber on the left side as viewed in FIG. 2 of the small-diameter rod portion of the piston 56b constitutes an operating oil chamber. Thus, when the pressurized air supplied through the second port of the fluid receiving port 55 acts on the large-diameter disc portion of the piston 56b, the same is moved toward the left, whereby the oil pressure in the operating oil chamber is boosted. In this way, the air-oil pressure transforming section 56 operates to transform the pressurized air into the pressurized oil and boots the pressurized oil.

The clamping member 57 comprises an L-shaped lever and is supported in the coarse motion housing 51. The clamping member 57 clamps the position of the coarse motion movable member 52 relative to the coarse motion housing 51 by pressing a part of the external surface of the coarse motion movable member 52. Conversely, the clamping member 57 unclamps the position of the coarse motion movable member 52 relative to the coarse motion housing 51 by releasing the pressing on the part of the external surface of the coarse motion movable member 52. Thus, the clamping member 57 serves as a switching lever for switching the clamping and unclamping of the coarse motion movable member 52. The clamping member 57 only performs switching the clamping and unclamping of the coarse motion movable member 52, but does not act to perform the sliding operation of the coarse motion movable member 52. That is, the operation for switching the clamping and unclamping by the clamping member 57 is performed independently of the sliding operation of the coarse motion movable member 52.

The clamping member 57 is provided with a support portion 57a which is located on one end side thereof and substantially pivotably supported by a pivot support portion 51d formed in the coarse motion housing 51, and an engaging claw 57b (pressing portion) which is located on the other end side thereof and is pressed on the external surface of the coarse motion movable member 52 to be engaged with either one of the plurality of grooves 52a. Thus, through the pivot movement about the support portion 57a, the clamping member 57 is operated to be switched into either of a state that the claw 57a is engaged with one of the grooves 52a of the coarse motion movable member 52 (i.e., clamping state) and another state that the claw 57a is disengaged from either of the grooves 52a of the coarse motion movable member 52 (i.e., unclamping state). The clamping member 57 is urged by a first spring 60 arranged in the coarse motion housing 51 in a direction to disengage the claw 57a from the grooves 52a of the coarse motion movable member 52.

Further, an engaging protrusion portion 57c having a taper surface is formed on a base end (on the side of the urging force generating section 58 referred to later) of the clamping member 57. The engaging protrusion portion 57c is formed so that in the state shown in FIG. 2, the protruding amount on the right side is smaller than the protruding amount on the left side.

The urging force generating section 58 generates on the clamping member 57 an urging force which acts in a direction (clamping direction) in which the clamping member 57 clamps the coarse motion movable member 52. The generating section 58 is provided with a second spring 58a and an urging member 58b. The second spring 58a is supported at one end of a round hole 51e which is radially formed in the coarse motion housing 51 at almost the center in the rotational axis of the boring holder 1.

The urging member 58b is in contact with the other end of the second spring 58a. The urging member 58b takes the form of a generally bottomed cylinder, and the second spring 58a is in contact with a bottom surface of the urging member 58b to urge the same. An operating oil chamber 51f is formed on the side opposite to the second spring 58a of the urging member 58b. The chamber 51f receives operating oil which is supplied from the operating oil chamber (the chamber on the lift side as viewed in FIG. 2 of the small-diameter rod portion of the piston 56b in the stepped cylinder 56a) of the air-oil pressure transforming section 56 through a communication passage 51g. Thus, the urging force of the second spring 58a and the pressure of the operating oil which counter each other act on the urging member 58b, and the position of the same in the sliding direction is determined in dependence on both of them.

Figure 2:
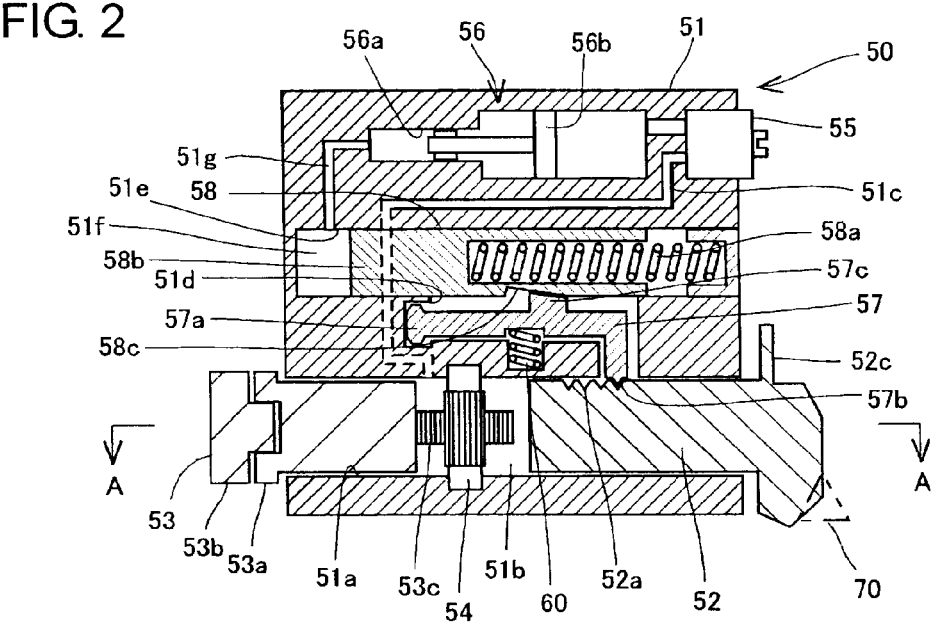
FIG. 2 is an enlarged longitudinal sectional view of a coarse motion adjusting mechanism incorporated in the boring holder.
Figure 3:
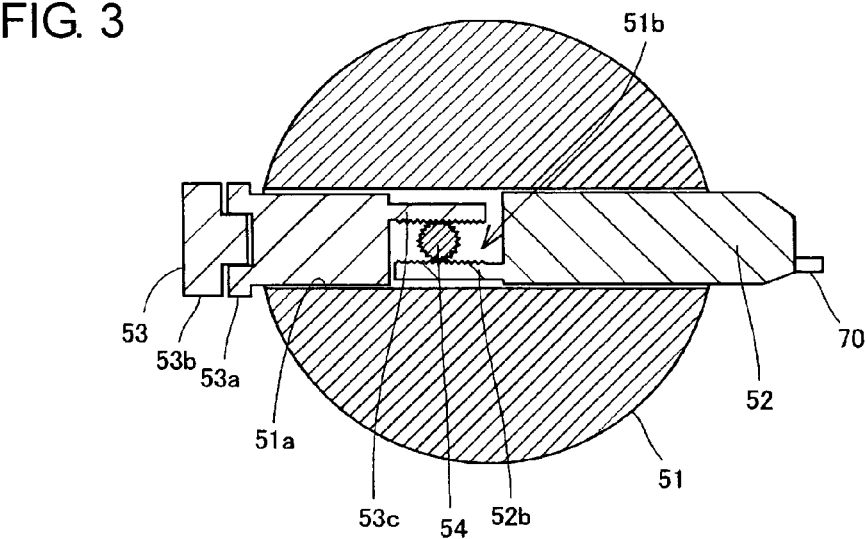
FIG. 3 is a cross-sectional view taken along the line A-A in FIG. 2.

The urging member 58b is formed at a part of the external surface thereof with a taper portion 58c which descends or recedes as it goes toward the left as viewed in FIG. 2. The taper portion 58c is not required to be formed over the whole circumference of the urging member 58b and suffices to be formed only in a predetermined angular range. The taper portion 58c is always in contact with the taper or inclined surface on the engaging protrusion portion 57c of the clamping member 57. That is, the taper portion 58c and the engaging protrusion portion 57c of the clamping member 57 are held in wedge engagement. The position where the inclined surface on the engaging protrusion portion 57c of the clamping member 57 contacts the taper portion 58c differs in dependence on the sliding position of the urging member 58b. Thus, the urging force with which the clamping member 57 clamps the coarse motion movable member 52 is adjusted in dependence on the sliding position of the urging member 58b.
(Fine Adjusting Method of Tool Radius by Fine Motion Adjusting Mechanism)

Figure 4:
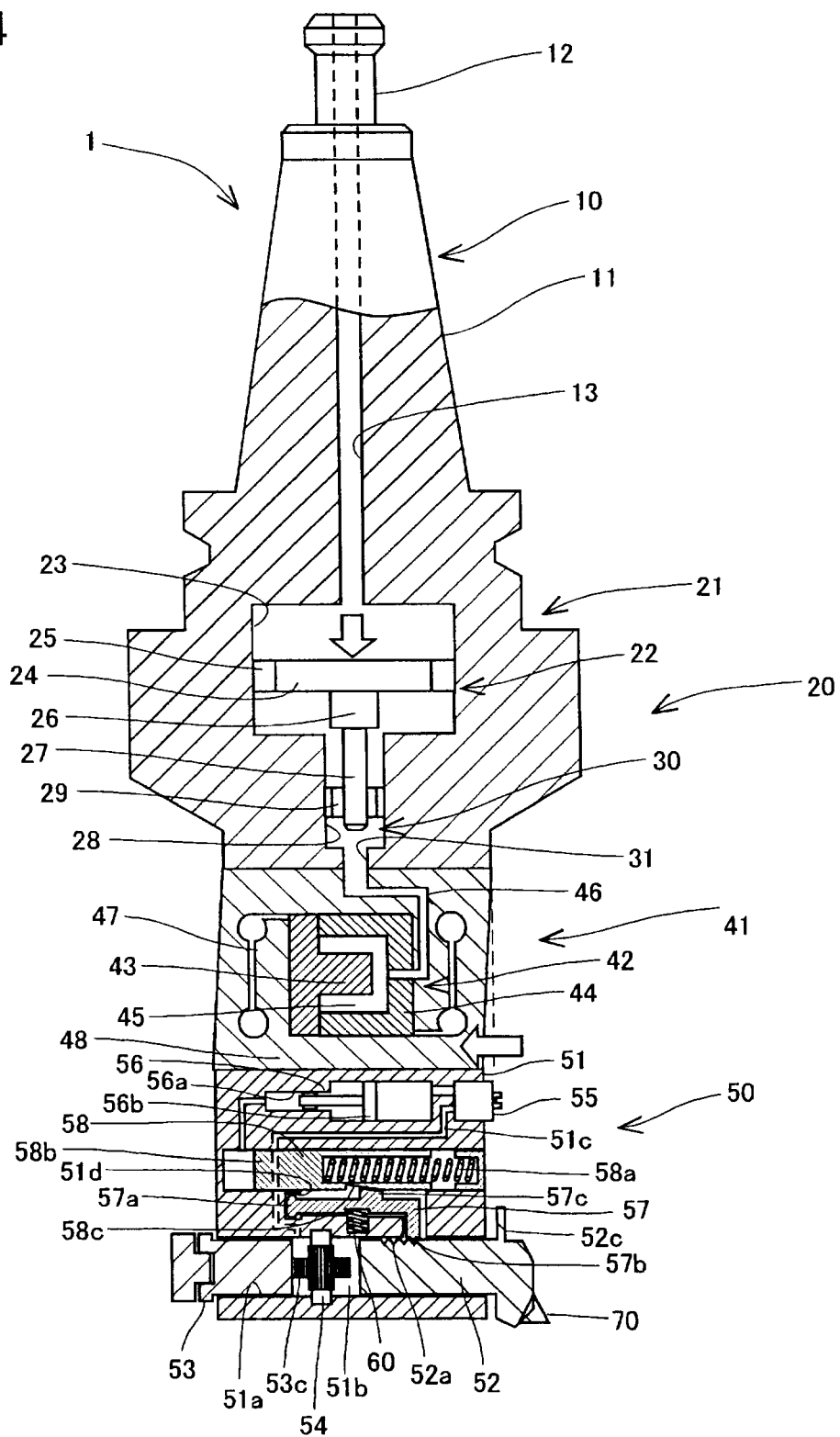
FIG. 4 is a longitudinal sectional view of the boring holder with a fine motion mechanism adjusted or operated.

Next, a fine adjusting method of the tool radius by the fine motion adjusting mechanism 20 will be described in detail with reference to FIGS. 1 and 4. Let it be now assumed that air at a predetermined controlled pressure is supplied from the tool spindle 2 side. Then, the first piston 24 of the air-oil pressure transforming section 22 is slidden toward the distal end side of the boring holder 1 in dependence on the air pressure. With movement of the first piston 24, the second piston 27 is also slidden toward the distal end side of the boring holder 1. The movement of the second piston 27 causes the operating oil filled in the operating oil chamber 30 to increase in pressure. The increase in the pressure of the operating oil is led through the communication passage 31 and the oil passage 46 to the oil pressure chamber 45 of the elastic deformation section 41, and the pressure in the oil pressure chamber 45 is increased. As a result, the fine motion portion 48 of the elastic deformation section 41 is shifted toward the left as shown in FIG. 4.

In this way, the fine motion portion 48 of the elastic deformation section 41 is finely moved radially relative to the base end body portion 21, whereby the coarse motion adjusting mechanism 50 which is attached on the fine motion portion 48 side of the elastic deformation section 41 is finely moved as a whole radially relative to the base end body portion 21. Therefore, the position relative to the rotational axis of the cutting blade 70 attached to the coarse motion movable member 52 is finely adjusted by the operation of the fine motion adjusting mechanism 20.

The amount of the fine motion adjustment is altered by adjusting the pressure of the air supplied from the tool spindle 2 side. The fine motion adjusting mechanism 20 serves to amplify the air pressure supplied from the tool spindle 2 side by the air-oil pressure transforming section 22. Therefore, it is possible to elastically deform the elastic deformation section 41 at a low air pressure. Further, the amount of the fine motion adjustment can be returned to zero by lowering to zero the air pressure supplied from the tool spindle 2 side. Because the fine motion adjustment by the fine motion adjusting mechanism 20 depends on the elastic deformation of the elastic deformation section 41, the amount of the fine motion adjustment is not so large. Conversely, the fine motion adjusting mechanism 20 is able to perform a very tiny or slight adjustment precisely.
(Coarse Adjusting Method of Tool Radius by Coarse Motion Adjusting Mechanism)

Next, the operation of the coarse motion adjusting mechanism 50 will be described in detail with reference to FIGS. 5 through 10. Since the coarse motion adjusting unit 80 is used in operating the coarse motion adjusting mechanism 50, description will first be described regarding the coarse motion adjusting unit 80.

Figure 5:
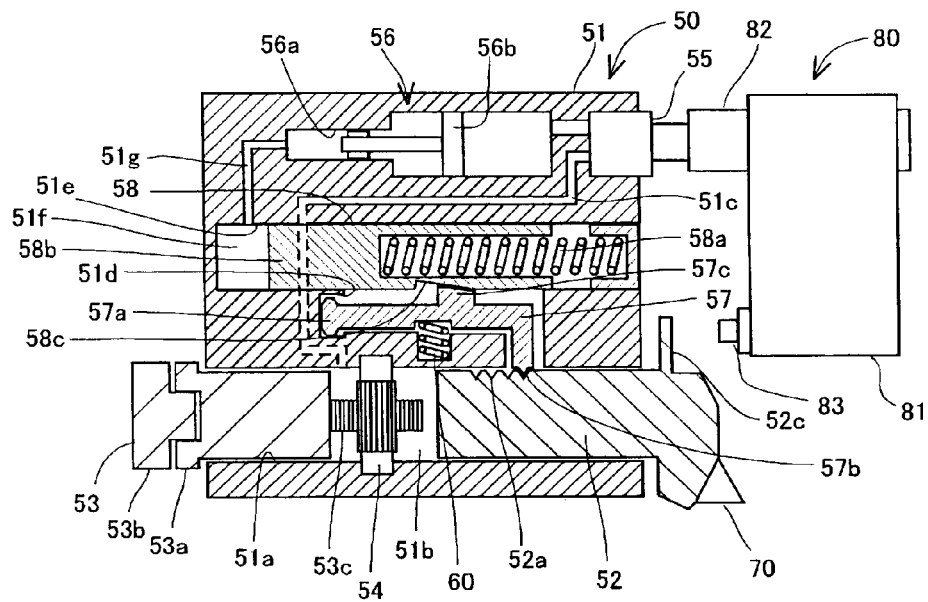
FIG. 5 is an enlarged longitudinal sectional view of the coarse motion adjusting mechanism at a coupling step.

As shown in FIG. 5, the coarse motion adjusting unit 80 is provided with a fluid supply device 81, a fluid supply slidable port 82 and a position adjusting reference member 83. The fluid supply device 81 is a device which is configured to supply air and to be able to control the air pressure it supplies. The device 81 is fixedly provided on, for example, a bed (not shown) of a machining center. In this particular embodiment, where the device 81 is applied to a machining center of the construction that the tool spindle 2 is movable relative to the bed, the fluid supply device 81 of the coarse motion adjusting unit 80 is provided movably relative to the tool spindle 2.

The fluid supply slidable port 82 is a port which is adapted to be coupled to the fluid receiving port 55 of the coarse motion adjusting mechanism 50 and which is able to supply the fluid receiving port 55 with the air supplied from the fluid supply device 81. The slidable port 82 is provided slidably relative to the fluid supply device 81 in the left-right direction as viewed in FIG. 5. Further, the slidable port 82 is provided with a first coupling port mating with the first port of the fluid receiving port 55 and a second coupling port mating with the second port of fluid receiving port 55. The fluid supply device 81 is configured to make a switching between supplying pressurized air from the first coupling port of the fluid supply slidable port 82 and supplying pressure air from the second coupling port. The position adjusting reference member 83 is secured to the fluid supply device 81 and is provided to be contactable with the reference portion 52c provided on the coarse motion movable body 52.

Next, an adjusting method of the tool radius by the coarse motion adjusting mechanism 50 will be described. First of all, as shown in FIG. 5, the tool spindle 2 and the coarse motion adjusting unit 80 are relatively moved to couple the fluid receiving port 55 of the coarse motion adjusting mechanism 50 to the fluid supply slidable port 82 of the coarse motion adjusting unit 80 (coupling step). More specifically, the first and second ports of the fluid receiving port 55 are coupled respectively to the first and second coupling ports of the fluid supply slidable port 82. At this time, the fluid supply slidable port 82 of the coarse motion adjusting unit 80 is held in a state that it has been shifted to the leftmost position as shown in FIG. 5. Further, in this state, the reference portion 52c of the coarse motion movable body 52 is in position to face the position adjusting reference member 83 of the coarse motion adjusting unit 80.

Figure 6:
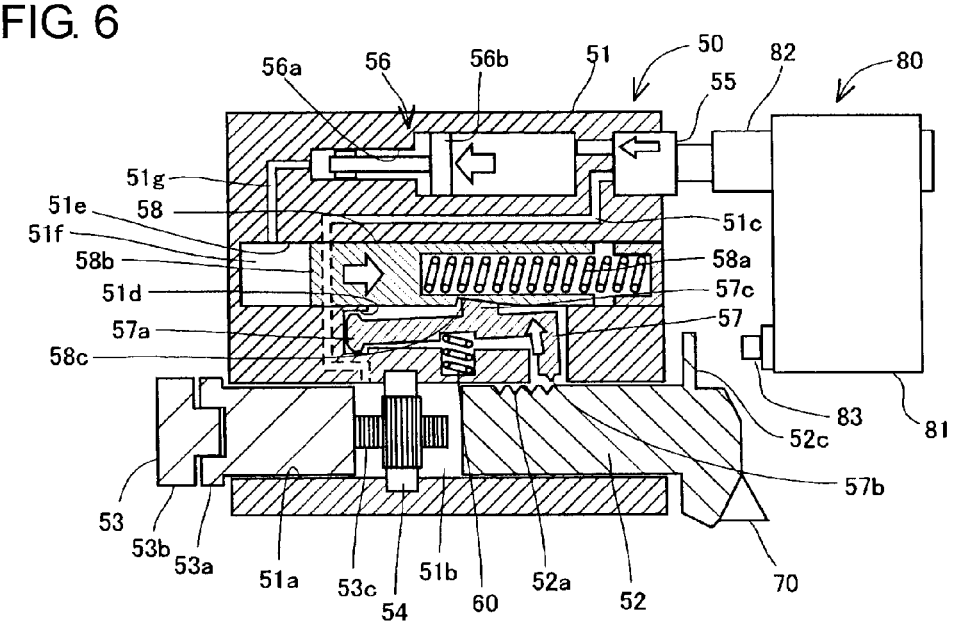
FIG. 6 is an enlarged longitudinal sectional view of the coarse motion adjusting mechanism at an unclamping step.

Then, as shown in FIG. 6, the fluid supply device 81 supplies pressurized air to the right-side chamber of the large-diameter disc portion of the piston 56b in the stepped cylinder 56a of the air-oil pressure transforming section 56 through the second coupling port of the fluid supply slidable portion 82 and through the second port of the fluid receiving portion 55. Thus, the piston 56b of the air-oil pressure transforming section 56 is moved toward the left as viewed in FIG. 6 to raise the oil pressure in the chamber located at the left side of the small-diameter rod portion of the piston 56b in the stepped cylinder 56a as viewed in FIG. 6 as well as in the operating oil chamber 51f. With the pressure rising of the operating oil, the urging member 58b is slidden toward the right as viewed in FIG. 6 against the urging force of the second spring 58a. This causes the taper portion 58c formed on the external surface of the urging member 58b to be shifted toward the right as viewed in FIG. 6. With this, the contact position between the engaging protruding portion 58c of the clamping member 57 and the taper portion 58c is moved upward. Thus, the urging force of the first spring 60 causes the clamping member 57 to pivot counterclockwise in FIG. 6 about the support portion 57a, whereby the claw 57b is disengaged from one of the grooves 52a on the coarse motion movable body 52. As a result, the coarse motion movable body 52 is unclamped from the coarse motion housing 51 (unclamping step). At this time, the fluid supply device 81 keeps constant the air pressure supplied to the second coupling port side of the fluid supply slidable port 82.

Figure 7:
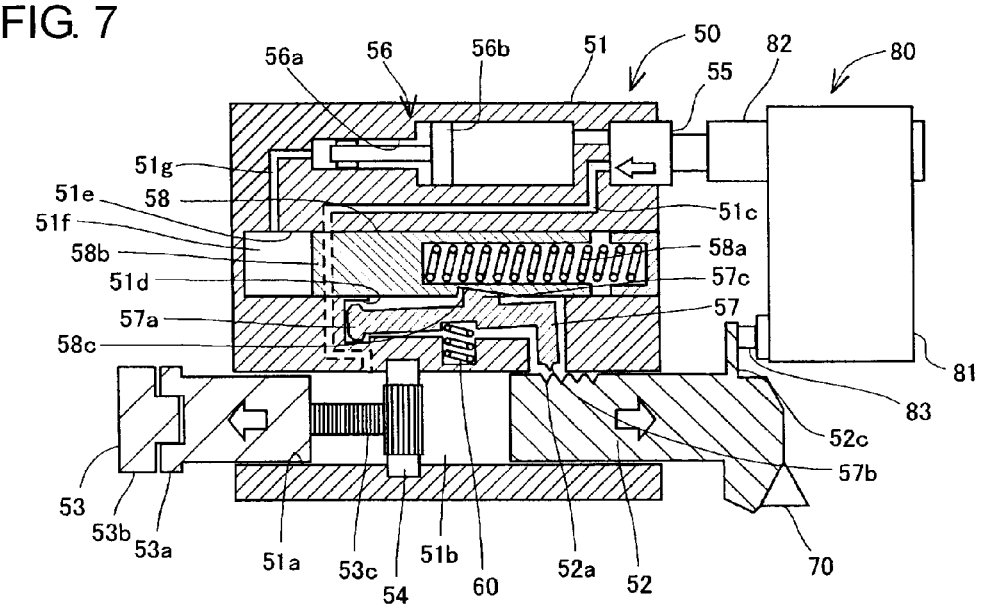
FIG. 7 is an enlarged longitudinal sectional view of the coarse motion adjusting mechanism at a contact step.

Subsequently, as shown in FIG. 7, the fluid supply device 81 supplies pressurized air to the air passage 51c through the first coupling port of the fluid supply slidable port 82 and through the first port of the fluid receiving port 55. Thus, the air pressure in the air residence chamber 51b is raised to generate a pressure which enlarges the volume of the air residence chamber 51b. With the air pressure rising in the air residence chamber 51b, the coarse motion movable member 52 and the couterweight 53 are slidden in the directions to go away from each other, that is, are slidden mutually radially outward. The coarse motion movable body 52, the couterweight 53 and the pinion shaft 54 constitute a rack-and-pinion mechanism. Therefore, the radially outward sliding movement of the coarse motion movable member 52 and the radially outward sliding movement of the couterweight 53 are synchronized and linked together. The sliding amount of the coarse motion movable body 52 and sliding amount of the couterweight 53 are the same but opposite in direction.

When the coarse motion movable body 52 is slidden radially outward in this way, the reference portion 52c of the coarse motion movable body 52 is brought into contact with the position adjusting reference member 83 of the coarse motion adjusting unit 80 (contact step). At this time, the position of the cutting blade 70 has been moved to a predetermined position (e.g., the farthest position) in a direction to go away from the rotational axis of the boring holder 1. That is, in the state that the fluid supply slidable port 82 is at the leftmost position relative to the fluid supply device 81 as viewed in FIG. 7 and has been coupled with the fluid receiving portion 55 and that the reference portion 52c of the coarse motion movable member 52 is in contact with the position adjusting reference member 83, the position of the cutting blade 70 relative to the rotational axis, that is, the tool radius has been known. This state will be referred to a reference state. That is, the reference state is established at the contact step.

Figure 8:
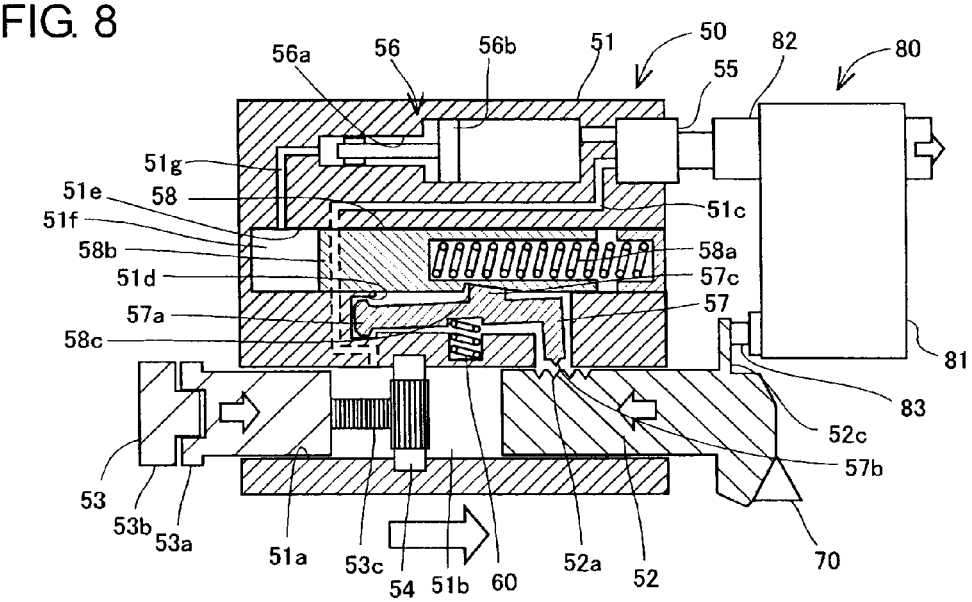
FIG. 8 is an enlarged longitudinal sectional view of the coarse motion adjusting mechanism at an adjusting step.

Subsequently, as shown in FIG. 8, the relative position between the tool spindle 2 and the position adjusting reference member 83 is changed from the reference state in a direction to come close to each other. For example, in a machining center with one or more drive axes for moving the tool spindle 2, one of the drive axes is operated to move the tool spindle 2 in the direction to come close to the position adjusting reference member 83. In this case, the tool radius in the reference state has already been known, and a target tool radius has also been grasped. Therefore, the tool spindle 2 is moved by the difference between the target tool radius and the tool radius in the reference state in the direction to come close to the position adjusting reference member 83. In this way, the coarse adjustment is made regarding the position of the cutting blade 7 relative to the rotational axis, that is, the tool radius (adjusting step).

When the position of the cutting blade 70 relative to the rotational axis is adjusted at this adjusting step, the air which was supplied to slide the coarse motion movable member 52 relative to the coarse motion housing 51 in the direction that the position of the cutting blade 70 goes away from the rotational axis is exhausted outside through the slight clearance between each of the coarse motion movable member 52 and the counterweight 53 and the round hole 51a formed in the coarse motion housing 51.

Figure 9:
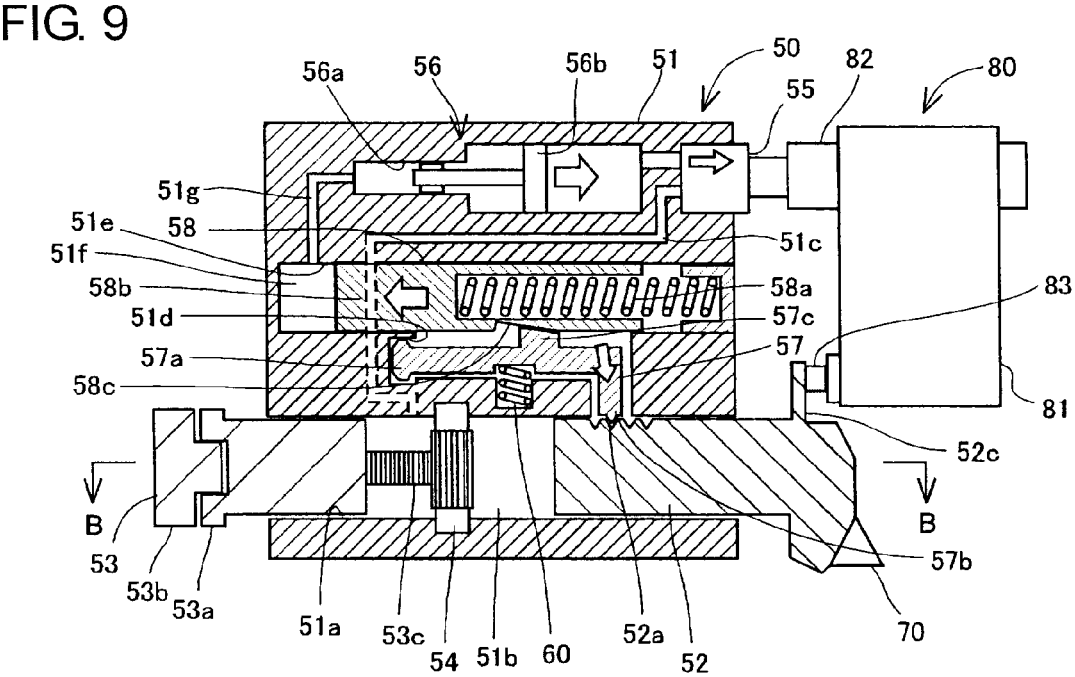
FIG. 9 is an enlarged longitudinal sectional view of the coarse motion adjusting mechanism at a clamping step.
Figure 10:
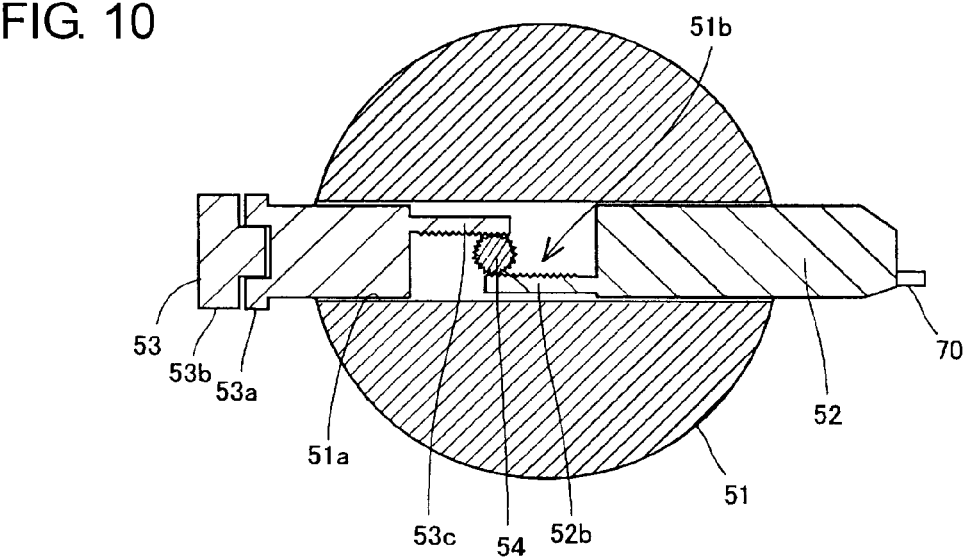
FIG. 10 is a cross-sectional view taken along the line B-B in FIG. 9.

Then, as shown in FIGS. 9 and 10, the fluid supply device 81 lowers the air pressure which it has supplied until then through the second coupling port of the fluid supply slidable port 82 and through the second port of the fluid receiving port 55. Thus, the piston 56b of the air-oil pressure transforming section 56 is moved toward the right as viewed in FIG. 9, and the oil pressure is lowered in the chamber on the left side as viewed in FIG. 9 of the small-diameter rod portion of the piston 56b in the stepped cylinder 56a as well as in the operating oil chamber 51f. With the pressure drop of the operating oil, the urging member 58b is slidden toward the left as viewed in FIG. 9 by means of the urging force of the second spring 58a. Thus, the position of the taper portion 58c formed on the external surface of the urging member 58b is shifted toward the left as viewed in FIG. 9. This results in moving the contact potion between the engaging protruding portion 57c of the clamping member 57 and the taper portion 58c downward as viewed in FIG. 9. Thus, the clamping member 57 is pivoted clockwise as viewed in FIG. 9 about the support portion 57a against the urging force of the first spring 60, whereby the claw 57b is pressed against the external surface of the coarse motion movable member 52. At this time, the claw 57b is pressed on and engaged with one of the grooves 52a on the coarse motion movable member 52. As a consequence, the coarse motion movable member 52 is clamped on the coarse motion housing 51 (clamping step).

(Specific Application Example in Machining Center)

Figure 11:
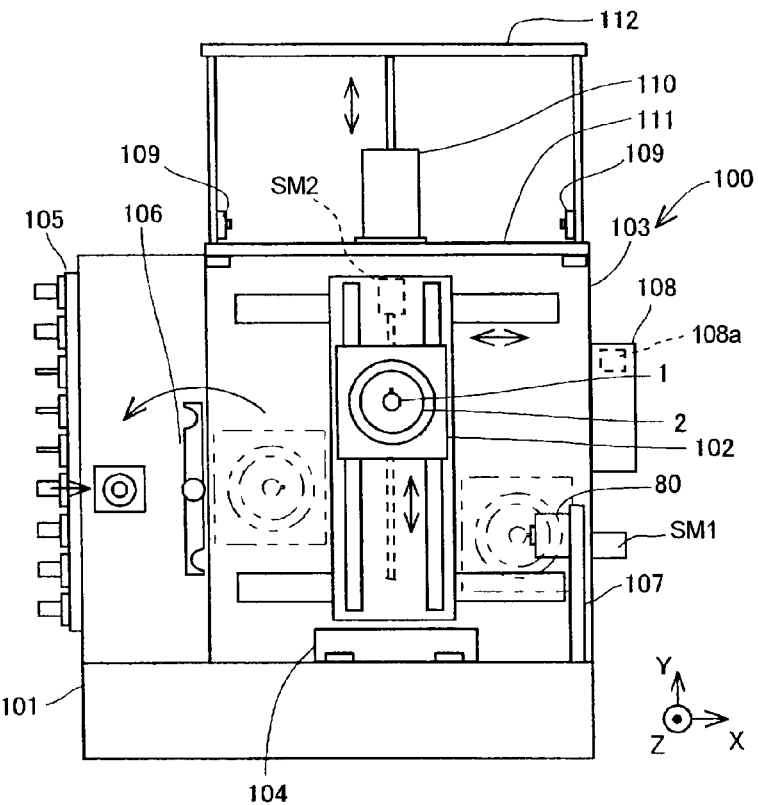
FIG. 11 is a front view of a machining center with a tool radius measuring device arranged in an upper space of the machining center.

Next, with reference to FIGS. 11 and 12, description will be made regarding a machining center 100 mounting the aforementioned boring holder 1 and the aforementioned coarse motion adjusting unit 80. As shown in FIG. 11, the machining center 100 is exemplified as a horizontal machining center, wherein a spindle head 102 rotatably supporting the aforementioned tool spindle 2 is movable relative to a column 103 fixed on a bed 101 in an X-axis direction and a Y-axis direction which are orthogonal to each other. Further, a table 104 for mounting a workpiece thereon is movable in a Z-axis direction which is also orthogonal to each of the X and Y-axis directions. Further, a tool magazine 105 for storing a plurality of tools (including the aforementioned tool holder 1 and other tool holders with various too tips) is provided on the left side of the column 103 in a front view. In addition, a tool exchange device 106 for exchanging a tool held in the tool spindle 2 with a selected one of the tools stored in the tool magazine 105 is provided between the tool magazine 105 and the column 103. In this particular embodiment, a next tool to be exchanged by the tool exchange device 106 is turned through 90 degrees from the state being stored in the tool magazine 105 and is moved to a next-tool change position. The aforementioned coarse motion adjusting unit 80 is secured to a support pillar 107 upstanding at the right side of the bed 101. The adjusting unit 80 is provided within a machining area in the machining center 100. Further, a controller 108 is provided on the right side surface of the column 103.

When the coarse adjustment of the tool radius is to be made by the coarse motion adjusting mechanism 50, first of all, the spindle head 102 is moved in the Y-direction to bring the height along the Y-axis of the fluid receiving port 55 of the coarse motion adjusting mechanism 50 into agreement with the height along the Y-axis of the fluid supply slidable port 82 of the coarse motion adjusting unit 80. Then, the spindle head 102 is moved in the X-axis direction to couple the fluid receiving port 55 with the fluid supply slidable port 82. Subsequently, the aforementioned unclamping step, contact step, adjusting step and clamping step are carried out in order.

The drive mechanisms for moving the spindle head 102 along the X and Y-axes are those (e.g., servomotors SM1, SM2 and ball screws connected thereto) used in positioning the spindle head 102 during the machining of the workpiece with the cutting blade 70. Since the coarse motion adjusting unit 80 is arranged within the machining area, the coarse adjustment of the tool radius by the coarse motion adjusting mechanism 50 is carried out using these drive mechanisms. That is, the coarse adjustment of the tool radius can also be done by utilizing the drive mechanisms composed of the servomotors SM1, SM2 and the ball screws connected thereto, which are used in positioning the spindle head 102. Therefore, it is possible to carry out the adjustment of the tool radius without providing any drive means dedicated to the coarse adjustment.

Furthermore, the machining center 100 is provided with a top cover 111 over the spindle head 102 at the same height as a top surface of the column 103. A cylinder 110 is provided on the upper side of the top cover 111. A vertical sliding member 112 taking an inverted U-shape is attached to an upper end of a movable rod of the cylinder 110. Tool radius measuring devices 109 are attached to lower parts of left and right plate portions of the vertical sliding member 112. The measuring devices 109 are devices which are paired by those on the left and right units and which are able to measure the tool radius of the boring holder 1 by means of laser beams. Usually, the measuring devices 109 are positioned in a space over the top cover 111.

Figure 12:
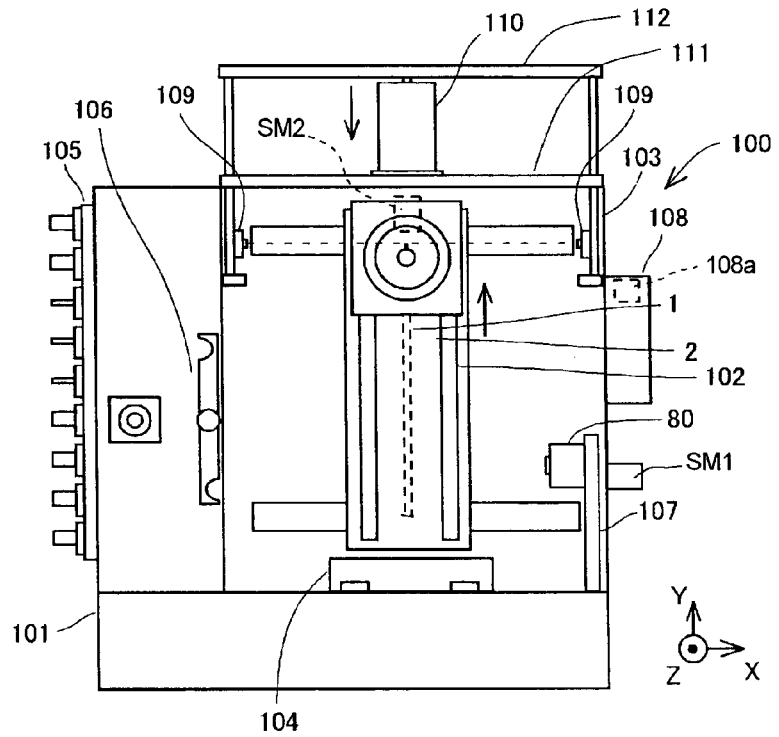
FIG. 12 is a front view of the machining center with the tool radius measuring device located in a machining space to measure the tool radius.

The vertical sliding member 112 is slidden downward by moving the movable rod of the cylinder 110 downward as shown in FIG. 12. Thus, the measuring devices 109 attached to the lower parts of the left and right plate portions of the vertical sliding member 112 are advanced into the machining area. That is, the measuring devices 109 are brought into the position shown in FIG. 12, where they are able to measure the tool radius of the boring holder 1.

(Automatic Tool Radius Adjusting Processing)

Next, with reference to a flow chart shown in FIG. 13, description will be made regarding an automatic adjusting processing for the tool radius of the boring holder 1 in the aforementioned machining center 100 (corresponding to "tool radius adjusting system" in the claimed invention).

First of all, a judgment is made as to whether or not the number of times in use of the cutting blade 70 attached to the boring holder 1 which is an objective to be adjusted presently has reached a predetermined number of times (S1). This judgment is for the purpose of not performing the tool radius adjustment to compensate for a wear of the cutting blade 70 until the number of times in use of the cutting blade 70 reaches the predetermined number of times, but of performing the tool radius adjustment to compensate for a wear of the cutting blade 70 when the number of times in use of the cutting blade 70 reaches the predetermined number of times.

Then, if the number of times in use of the cutting blade 70 has not yet reached the predetermined number of times at step S1, a further judgment is made as to whether or not the tool radius has already been stored in a memory device 108a (refer to FIGS. 11 and 12) of the controller 108 at the last time (S2). As referred to later, once the tool radius is adjusted, it is executed at step S10 to store the present tool radius. That is, this judgment is performed for the reason that where the boring holder 1 whose tool radius was adjusted at the last time becomes an objectives to be adjusted at the present time, the adjustment is to be done using the information on the tool radius which was stored at the last time. If the tool radius was stored in the memory device 108a at the last time (S2:Y), the last-time tool radius is set as the present tool radius, wherein a difference $\Delta D$ between the present tool radius and a target tool radius is calculated (S4). This difference $\Delta D$ is taken as a compensation amount.

If the number of times in use of the cutting blade 70 has reached the predetermined number of times at step S1 (S1:Y), the present tool radius is measured because the wear is not considered negligible (S3). As aforementioned with reference to FIG. 12, the measurement of the tool radius is done by lowering the tool radius measuring devices 109 and then by measuring the tool radius of the boring holder 1. Further, also where it is judged at step S2 that the last-time tool radius was not stored (S2: N), the present tool radius is measured (S3). After the tool radius is measured at step S3, the measured tool radius is set as the present tool radius, wherein a difference $\Delta D$ between the present tool radius and the target tool radius is calculated (S4).

Thereafter, it is judged whether or not the compensation amount $\Delta D$ being the calculated difference is smaller than a fine adjustable range Dfine for the fine motion adjusting mechanism 20 (S5). The fine adjustable range Dfine is a predetermined value. If the compensation amount ΔD is smaller than the fine adjustable range Dfine (S5: Y), the fine adjustment for the compensation amount ΔD only is performed by the fine motion adjusting mechanism 20 (S9).

Then, the tool radius after the compensation is stored as the present tool radius (S10). As mentioned earlier, the tool radius stored here is the information used at step S2. Subsequently, a highest or maximum rotational speed of the tool spindle 2 is set in dependence on the adjusted tool radius, and the processing is terminated (S11). The larger the tool radius is, the slower the maximum rotational speed is set to become. In an actual machining, the rotational speed of the tool spindle 2 set by the controller 108 is restricted within the maximum rotational speed set here.

Where at step S5, the compensation amount ΔD being the calculated difference is judged to be equal to or greater than the fine adjustable range Dfine for the fine motion adjusting mechanism 20 (S5: N), a coarse adjustment is carried out by the coarse motion adjusting mechanism 50 (S6). In this particular embodiment, the coarse adjustment by the mechanism 50 depends on the pitch or the interval of the grooves 52a formed on the coarse motion movable body 52. Therefore, a coarse adjustment which precisely agrees with the target compensation amount ΔD cannot be done. That is, the coarse adjustment here results in carrying out a coarse adjustment by a compensation amount which is closest to the compensation amount ΔD.

Therefore, following the coarse adjustment, the tool radius of the boring holder 1 after the coarse adjustment is measured (S7). The measurement of the tool radius here is carried out by moving the tool radius measuring devices 109 downward and then by measuring the tool radius of the boring holder 1, as mentioned earlier with reference to FIG. 12. Then, a difference ΔD between the measured present tool radius and the target tool radius is calculated again (S8).

This difference ΔD is a compensation amount in a fine adjustment to be performed next. Then, the fine motion adjusting mechanism 20 is operated to make a fine motion adjustment by the compensation amount ΔD which is calculated newly at this time (S9). Then, the tool radius after the compensation is stored as the present tool radius (S10). Thereafter, a maximum rotational speed of the tool spindle 2 is set in dependence on the adjusted tool radius, and the processing is terminated (S11). In this way, the automatic adjustment of the tool radius is carried out.

EFFECTS OF THE PRESENT EMBODIMENT

In the boring holder 1 described hereinabove, the holder portion 10, the fine motion adjusting mechanism 20, the coarse motion adjusting mechanism 50 and the cutting blade 70 are attached in order from the tool spindle 2 side toward the distal end. Thus, even when the coarse motion movable body 52 is radially moved by the coarse motion adjusting mechanism 50, no movement is given to the fine motion adjusting mechanism 20. The portions radially moved by the coarse motion adjusting mechanism 50 include the coarse motion movable body 52 and the cutting blade 70, but do not include the fine motion adjusting mechanism 20. Further, the counterweight 53 is configured to be included in the coarse motion adjusting mechanism 50. Therefore, the counterweight 53 suffices to be designed taking the masses of the coarse motion movable body 52 and the cutting blade 70 into consideration, but is not required to be designed taking the mass of the fine motion adjusting mechanism 20 into consideration. Therefore, according to the boring holder 1 in the present embodiment, it is possible to diminish the mass of the counterweight 53. As a result, the mass of the boring holder 1 as a rotational body can be diminished as a whole.

Further, since the counterweight 53 is configured to be adjustable in position relative to the coarse motion housing 51, the occurrence of an eccentric motion can be further suppressed by adjusting the position of the counterweight 53 in dependence on the moving amount of the coarse motion movable body 52. Further, since the counterweight 53 is configured to be moved synchronously with the coarse motion movable body 52 by the same moving amount as the coarse motion movable body 52, it is possible to automatically carry out the position adjustment of the counterweight 53. Further, without providing any dedicated mechanism for clamping the counterweight 53, clamping the coarse motion movable body 52 makes it possible to clamp the counterweight 53 simultaneously.

Further, by making a fine motion adjustment through an elastic deformation of the fine motion adjusting mechanism 20, it is possible to make the fine motion adjustment precisely. Further, the counterweight 53 is configured to be included in the coarse motion adjusting mechanism 50. Thus, the aforementioned counterweight 53 is unable to absorb an imbalance caused by an eccentric motion which results from the adjustment of the fine motion adjusting mechanism 20. However, the adjusting amount by the fine motion adjusting mechanism 20 is within the elastic deformation thereof and is very tiny or little. Therefore, by providing the coarse motion adjusting mechanism 50 with the counterweight 53, it is possible as a whole of the boring holder 1 to appropriately absorb the imbalance caused by the eccentric motion.

Further, the clamping/unclamping operation of the clamping member 57 and the sliding operation of the coarse motion movable body 52 are performed as respectively independent operations. That is, the means for sliding the coarse motion movable body 52 uses means which are independent of the operation of the clamping member 57, that is, the fluid supplied from the fluid supply device 81 and the drive mechanism for moving the coarse motion movable body 52 in this particular embodiment. In this way, freedom is increased in choosing the means for sliding the coarse motion movable body 52.

Further, in this particular embodiment, the switching between the clamping and the unclamping of the coarse motion movable body 52 by the clamping member 57 is performed by the action of the pressurized air supplied from the fluid supply device 81. Particularly, the clamping is done when the clamping member 57 presses the coarse motion movable body 52, whereas the unclamping is done when the clamping member 57 releases the pressing on the coarse motion movable body 52. Thus, it is possible to constitute the clamping member 57 by a very simple means. Further, the clamping is done by pressing the coarse motion movable body 52 by means of the claw 57b of the clamping member 57. By taking the construction having the claw 57b in this manner, it is possible to constitute the clamping member 57 very easily. Further, the clamping of the coarse motion movable body 52 is done by engaging the claw 57b of the clamping member 57 with either one of the plurality of grooves 52a. This makes it possible to position the coarse motion movable body 52 reliably.

Further, the urging member 58b is slidden in dependence on the urging force of the second spring 58a and the magnitude of the air pressure supplied from the fluid supply device 81 through the second coupling port. When the urging member 58b is slidden, the clamping member 57 applies to the coarse motion movable body 52 an urging force depending on the sliding position of the urging member 58b. Because the urging member 58b and the clamping member 57 are in wedge engagement, the force of the urging member 58b in the sliding direction is amplified by the wedge engagement in generating the pressing force from the urging member 58b against the clamping member 57. Accordingly, it is possible to generate a strong clamping force from a small force.

Furthermore, the pressurized air supplied from the fluid supply device 81 is used in sliding the coarse motion movable body 52 as well as in clamping/unclamping the clamping member 57. That is, the pressurized air supplied from the fluid supply device 81 is used for two different tasks: the operation of the clamping member 57 and the sliding operation of the coarse motion movable body 52. By performing the operations of two kinds by the use of the single fluid supply device 81, it is possible to realize miniaturization as a whole.

Still further, in adjusting the tool radius by the coarse motion adjusting mechanism 50, the reference state is set with the position of the cutting blade 70 moved to the predetermined position in the direction to go away from the rotational axis and with the reference portion 52c of the coarse motion movable body 52 held in contact with the position adjusting reference member 83, and the relative position between the tool spindle 2 and the position adjusting reference member 83 is changed from the reference state in the direction to come close to each other. As a result, the position of the cutting blade 70 relative to the rotational axis is adjusted by moving the position of the cutting blade 70 from the reference state to come close to the rotational axis. In this way, by providing the coarse motion movable body 52 with the reference portion 52c and by newly providing the position adjusting reference member 83 in order to set the reference state, it becomes possible to adjust the tool radius automatically.

Furthermore, by using the pressurized air supplied from the fluid supply device 81, the position of the cutting blade 70 is brought to the predetermined position (e.g., the furthest position) in the direction to go away from the rotational axis. Thus, it become possible to easily realize the contact step of bringing the reference portion 52c of the coarse motion movable body 52 into contact with the position adjusting reference member 83. Where fluid is used for moving the cutting blade 70 to the predetermined position in the direction to go away from the rotational axis at the contact step, the supplied air is exhausted through the slight clearance which is formed between each of the coarse motion movable body 52 and the counterweight 53 and the coarse motion housing 51, at the contact step and the adjusting step. Thus, there is given an air purge function of preventing cutting chips, dusts or the like from entering the coarse motion housing 51 through the slight clearance.

In addition, since the coarse motion adjusting unit 80 and the boring holder 1 are provided as separate devices, it is possible to diminish the mass of the boring holder 1 itself. Even in this case, since the both devices are configured to be coupled, it is possible to adjust the tool radius reliably.

Figure 13:
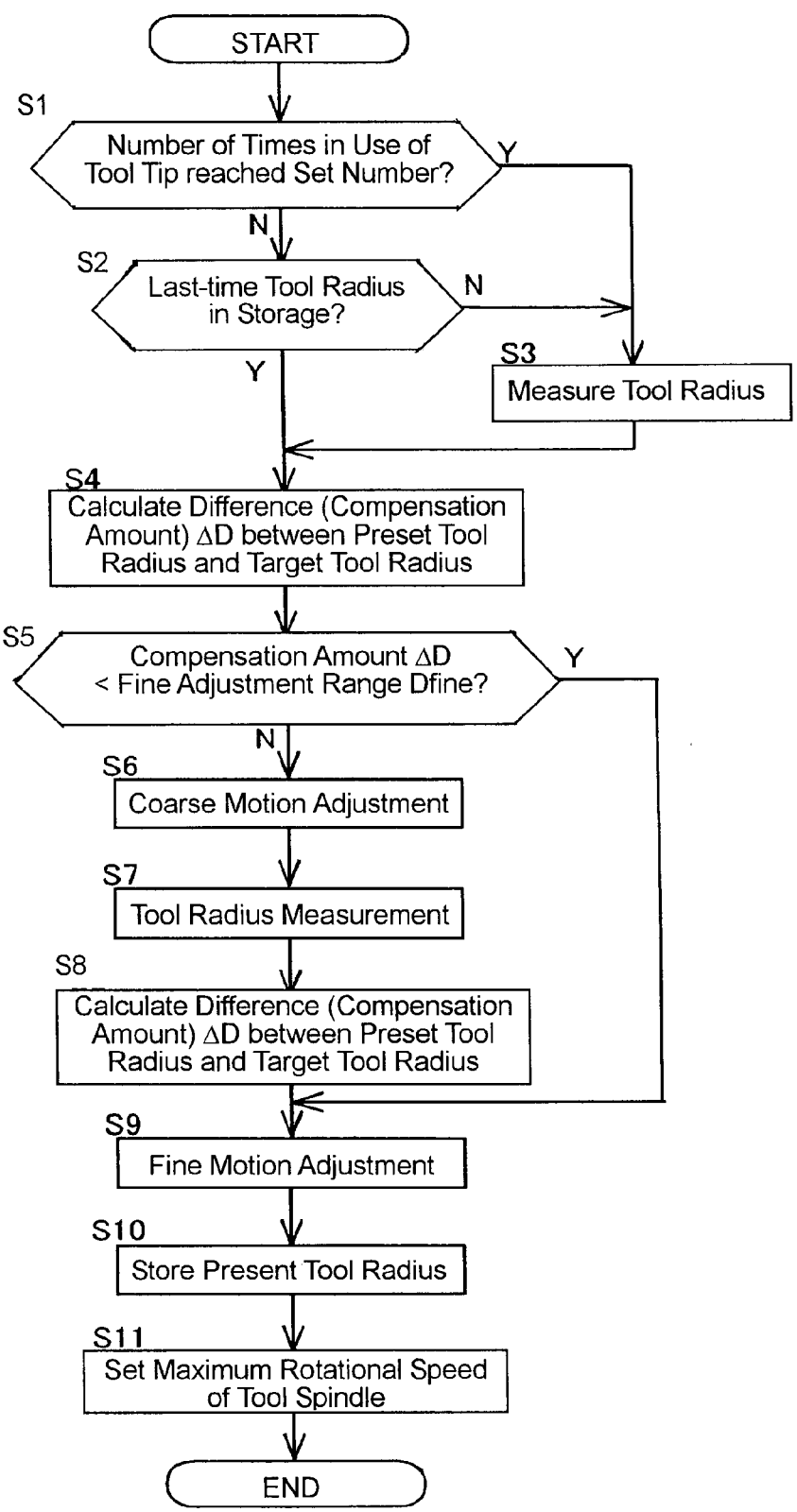
FIG. 13 is a flow chart of an automatic tool radius adjusting processing in the first embodiment.

Further, in the present embodiment, a determination is made as to whether to operate the fine motion adjusting mechanism 20 only or both of the fine and coarse motion adjusting mechanisms 20, 50 in dependence on the compensation amount ΔD calculated at step S4 in FIG. 13. In this way, it is possible to appropriately operate the fine and coarse motion adjusting mechanisms 20, 50 in dependence on the compensation amount ΔD.

Further, at step S10 of FIG. 13, the present tool radius is stored each time the tool radius is adjusted. Thus, at step S2, the last-time tool radius which has been stored as the present tool radius is utilized, and thus, it is not required to measure the tool radius before each compensation of the tool radius. Accordingly, it is possible to shorten the time taken for compensation of the tool radius.

Still furthermore, the controller 108 sets the maximum rotational speed of the tool spindle 2 depending on the tool radius of the boring holder 1 in machining a workpiece with the boring holder 1. Thus, it becomes possible to maintain the rotation of the boring holder 1 safely. In the present embodiment, the setting of the maximum rotational speed of the tool spindle 2 is changed in dependence on the adjusted tool radius of the tool holder 1. However, without being limited to this, the rotational speed of the tool spindle 2 may be set in dependence on the maximum tool radius set to the boring holder 1.

Moreover, although the tool radius measuring devices 109 have been described as those utilizing laser beams, any device or devices capable of measuring the tool radius/diameter can instead be used without being limited to those utilizing laser beams. In addition, without being limited to the devices which directly measure the tool radius as is the case of the present embodiment, there may be used any device or devices which make it possible to measure the tool radius indirectly. For example, there may be implemented a method of machining a workpiece once in measuring the tool diameter and then, of measuring a bore diameter of the machined workpiece by the use of a touch sensor or the like. Needlessly, any tool tip of various kinds can be used in place of the cutting blade 70.

Second Embodiment

A boring holder in a second embodiment will be described with reference to FIGS. 14 and 15. The boring holder in the second embodiment differs in a coarse motion adjusting mechanism 90 only from the boring holder 1 in the foregoing first embodiment. Therefore, the coarse motion adjusting mechanism 90 only in the second embodiment will be described hereafter. Of the components of the coarse motion adjusting mechanism 90, some of them are the same as those in the coarse motion adjusting mechanism 50 in the first embodiment, and description regarding the same components will be omitted in exchange for designating the same components by the same reference numerals.

The coarse motion adjusting mechanism 90 in the second embodiment is a device which is attached to the distal end side of the fine motion adjusting mechanism 20 and which is able to coarsely adjust the position of the cutting blade 70 from the rotational axis, that is, the tool radius. The adjustable amount of the tool radius by the mechanism 90 is greater than the adjustable amount of the tool radius by the fine motion adjusting mechanism 20. The coarse motion adjusting mechanism 90 is composed of the coarse motion housing 51, a coarse motion movable body 92, the counterweight 53, the pinion shaft 54, the fluid receiving port 55, the air-oil pressure transforming section 56, a clamping member 97, and the urging force generating section 58. That is, in the coarse motion adjusting mechanism 90 in the second embodiment, the coarse motion movable body 92 and the clamping member 97 only differ from those in the coarse motion adjusting mechanism 50 in the first embodiment.

While the coarse motion movable body 52 in the first embodiment is formed with the plurality of grooves 52 on the external surface thereof, the coarse motion movable body 92 in the second embodiment is not formed with the grooves 52 and instead, is formed with a taper portion 92a. Specifically, the taper portion 92 on the external surface of the coarse motion movable body 92 which takes a round pillar shape is formed to be reduced in diameter as it goes from a distal end side (front end side) on which the cutting blade 70 is attached, toward a base end side (rear end side). That is, a sliding direction component of a force in a direction normal to the taper portion 92a which component urges the coarse motion movable body 92 to move relative to the coarse motion housing 51 is directed toward the side (rear end side) opposite to the distal end side (front end side) with the cutting blade 70 attached thereto of the coarse motion movable body 92. Other constructions of the coarse motion movable body 92 are the same as those of the coarse motion movable body 52 in the first embodiment.

While the clamping member 57 in the first embodiment has the claw 57b formed to engage with the grooves 52a, the clamping member 97 in the second embodiment has a pressing portion 97b whose end surface is formed to a shape mating to the taper portion 92a so that the clamping member 97 is able to press the taper portion 92a on the external surface of the coarse motion movable body 92. When the clamping member 97 presses and clamps the coarse motion movable body 92, the end surface of the pressing portion 97b of the clamping member 97 presses the taper portion 92a on the external surface of the coarse motion movable body 92. At this time, of the force acting on the coarse motion movable body 92 by being pressed by the pressing portion 97b, the sliding direction component is directed to counteract a force exerted by a workpiece during machining. Therefore, even when the coarse motion movable body 92 receives the force from the workpiece during machining, the coarse motion movable body 92 is held at a stable position. The taper angle of the taper portion 92a is set to a small angle of the degree that the pressing by the pressing portion 97b on the coarse motion movable body 92 does not cause the same to be moved in the sliding direction. Further, because no restrain is imposed on the position where the coarse motion movable body 92 is pressed by the pressing portion 97b, it is possible to arbitrarily set the positioning position of the coarse motion movable body 92 relative to the coarse motion housing 51.

Although in the second embodiment, the external surface of the coarse motion movable body 92 is formed to a taper shape, it may be formed to a cylindrical shape if a sufficient clamping force can be generated with the pressing portion 97b of the clamping member 97 pressing the coarse motion movable body 92. In this modified case, for a sufficient friction force to be generated, measures may be taken by, for example, implementing a coating treatment on either or both of the external surface of the coarse motion movable body 92 and the pressing surface of the clamping member 97.

(Automatic Tool Radius Adjusting Processing)

Next, with reference to a flow chart shown in FIG. 16, description will be made regarding an automatic tool radius adjusting processing for the boring holder 1 which is equipped with the coarse motion adjusting mechanism 90 in the second embodiment. In this processing, step S27 is newly added to the processing described in the first embodiment. Therefore, description regarding the details of the processing will be omitted for brevity.

First of all, a judgment is made as to whether or not the number of times in use of the cutting blade 70 attached to the boring holder 1 which is an objective to be adjusted presently has reached a predetermined number of times (S21). If at step S21, the number of times in use of the cutting blade 70 has not reached the predetermined number of times, a further judgment is made as to whether or not the tool radius was already stored at the last time (S22). If the last-time tool radius is stored (S22: Y), the last-time tool radius is set as a present tool radius, and a difference $\Delta D$ between the present tool radius and a target tool radius is calculated (S24). The difference $\Delta D$ is taken as a compensation amount.

If the number of times in use of the cutting blade 70 has reached the predetermined number of times at step S21 (S21: Y), the present tool radius is measured because the wear is not considered negligible (S23). Further, also where it is judged at step S22 that the last-time tool radius is not stored (S22: N), the present tool radius is measured (S23). After the tool radius is measured at step S23, the measured tool radius is set as the present tool radius, wherein a difference $\Delta D$ between the present tool radius and a target tool radius is calculated (S24).

Thereafter, it is judged whether or not the compensation amount $\Delta D$ being the calculated difference is smaller than a fine adjustable range Dfine for the fine motion adjusting mechanism 20 (S25). The fine adjustable range Dfine is a predetermined value. If the compensation amount $\Delta D$ is less than the fine adjustable range Dfine (S25: Y), the fine motion adjusting mechanism 20 is operated to perform a fine adjustment by the compensation amount $\Delta D$ (S30). Then, the tool radius after the compensation is stored as the present tool radius (S31). Subsequently, a maximum rotational speed of the tool spindle 2 is set in dependence on the adjusted tool radius, and the processing is terminated (S32). The larger the tool radius is, the slower the maximum rotational speed is set to become.

Where at step S25, the compensation amount $\Delta D$ being the calculated difference is judged to be equal to or greater than the fine adjustable range Dfine for the fine motion adjusting mechanism 20 (S25: N), a coarse adjustment is carried out by the coarse motion adjusting mechanism 90 (S26). The mechanism 90 in this particular embodiment is able to perform the positioning to an arbitrary position without having restrictions on the position to be adjusted as is the case of the coarse motion adjusting mechanism 50 in the foregoing first embodiment. Therefore, theoretically, the coarse motion adjustment performed at step S26 ought to bring the present tool radius into agreement with the target tool radius. However, there is a possibility that some variation in adjustment takes place in dependence on the positioning accuracy of the coarse motion adjusting mechanism 90.

Therefore, following the coarse adjustment, it is judged whether or not the target tool radius is smaller than a threshold value Dth (S27). If the target tool radius is equal to or larger than the threshold value Dth, the compensated tool radius at the present time is stored as the present tool radius (S31). Thereafter, a maximum rotational speed of the tool spindle 2 is set in dependence on the adjusted tool radius, and the processing is terminated (S32). That is, where the target tool radius is a large radius, the tool radius adjustment is terminated after the coarse motion adjustment only.

If the target tool radius is smaller than the threshold value Dth, on the contrary, the tool radius of the boring holder 1 after the coarse motion adjustment is measured (S28). The measurement of the tool radius is performed by moving the tool radius measuring devices 109 downward and then by measuring the tool radius of the boring holder 1, as mentioned earlier with reference to FIG. 12. Then, a difference $\Delta D$ between the measured present tool radius and the target tool radius is calculated again (S29).

The difference $\Delta D$ is taken as a compensation amount in a fine motion adjustment to be performed next. Because as mentioned earlier, the coarse motion adjusting mechanism 90 is able to perform the positioning to an arbitrary position, theoretically, the present tool radius ought to agree with the target tool radius by performing the coarse motion adjustment at step S26. However, a very little difference is likely to occur due to some variation which occurs in dependence on the positioning accuracy of the coarse motion adjusting mechanism 90. In particular, where a target machining diameter is a small diameter, the likelihood that such a very little difference becomes a problem is high. Therefore, the tool radius after the coarse motion adjustment is measured, and a compensation amount ΔD is calculated again.

Then, the fine motion adjusting mechanism 20 is operated to perform a fine motion adjustment by the compensation amount ΔD which is calculated newly at this time (S30). Then, the tool radius after the compensation is stored as the present tool radius (S30). Thereafter, a maximum rotational speed of the tool spindle 2 is set based on the adjusted tool radius, and the processing is terminated (S32). In this way, the automatic adjustment of the tool radius is carried out.

It is general that the machining tolerance is set to be large where the bore diameter to be machined of a workpiece is large but is set to be small where the bore diameter to be machined of a workpiece is small. Therefore, in this particular second embodiment, it is designed to perform the tool radius adjustment by using the fine motion adjusting mechanism 20 necessarily where the bore diameter to be machined of a workpiece is small, but to perform the tool radius adjustment by using the coarse motion adjusting mechanism 90 only where the bore diameter to be machined of a workpiece is large. Therefore, it is possible to appropriately operate the adjusting mechanisms in depended on the bore diameter of a workpiece to be machined.

Third Embodiment

Next, with reference to FIGS. 17 and 18, description will be made regarding how the coarse adjusting method of the tool radius by the coarse motion adjusting mechanism 50 of the aforementioned boring holder 1 is performed in a machining center in a third embodiment.

As shown in FIG. 17, the machining center 200 is exemplified as a horizontal machining center, wherein a spindle head 102 which rotatably supports the tool spindle 2 is movable in the mutually orthogonal X and Y-axis directions relative to the column 103 fixed on the bed 101. Further, the table 104 for mounting a workpiece thereon is movable on the bed 101 in the Z-axis direction which is orthogonal to each of the X and Y-axis directions. Additionally, the tool magazine 105 for storing a plurality of tools (i.e., the boring holder 1 and other tool holders with tool tips of various kinds) is provided on the left side as viewed from the front side of the machining center 200.

The tool exchange device 106 for exchanging a tool attached to the tool spindle 2 with a selected one of the tools stored in the tool magazine 105 is provided between the tool magazine 5 and the column 103. In this particular embodiment, a next tool to be exchanged by the tool exchange device 106 is moved to the next-tool change position (next-tool waiting position) by being horizontally turned through 90 degrees from the state stored in the tool magazine 105.

The coarse motion adjusting unit 80 is fixedly provided in a non-machining area which is out of a machining area defined over the table 104 and which is under the next-tool waiting position (corresponding to "tool standby area" in the claimed invention) where a next tool is caused to wait for a tool exchange operation with a used tool on the tool spindle 2. Further, an adjustment-dedicated drive mechanism 201 is constituted by a ball screw, a motor and the like which enable a tool to be slidden between the next-tool waiting position of the tool exchange device 106 and a coarse adjusting position where the coarse motion adjusting unit 80 is arranged. The controller 108 is mounted on the right surface of the column 103.

More specifically, as shown in FIG. 18, in the tool magazine 105, a plurality of tool sockets 210 each capable of storing a tool T therein are held in a plurality of magazine socket holders 211 each of which takes of a U-shape in cross-section. The magazine socket holders 211 are linked by a loop chain belt (not shown) which is circulated within an outer guide track 220. A selected one of the tool sockets 210 is transferred by a well-known transfer mechanism from the socket holder 211 to a standby socket holder 212 (corresponding to "holder support" in the claimed invention) through a cutout portion 220a of the guide track 220. The standby socket holder 212 which takes a U-shape in cross-section opens toward the tool magazine 105 to receive the tool socket 210 transferred from the tool magazine 105. The standby socket holder 212 is fixedly mounted on a bearing block 213 which is movably guided along a linear guide rail 214. The bearing block 213 carries a ball nut 215, and a ball screw 216 which is supported by a support bracket 217 attached to the tool magazine 105 is rotatable by a servomotor 218 mounted on the support bracket 217. Thus, when the servomotor 218 is operated, the standby socket holder 212 is moved downward from the next-tool waiting position WP to the coarse adjusting position AP indicated by the two-dot chain line in FIG. 18. The ball nut 215, the ball screw 216 and the servomotor 218 constitute the aforementioned adjustment-dedicated drive mechanism 201. It is to be noted that the term "tool" used herein encompasses tool holders with tool tips of various kinds and also encompasses the aforementioned boring holder 1.

In the third embodiment, the coarse adjustment of the tool radius by the coarse motion adjusting mechanism 50 is performed on the boring holder 1 which has been moved to the next-tool waiting position WP of the tool exchange device 106. More specifically, in performing the coarse adjustment, the boring holder 1 held in the standby socket holder 212 through the tool socket 210 is moved by the operation of the servomotor 218 downward (toward the lower side in the Y-axis direction) from the next-tool waiting position WP of the tool exchange device 106, and the fluid receiving port 55 of the coarse motion adjusting mechanism 50 is coupled to the fluid supply slidable port 82 of the coarse motion adjusting unit 80. Thereafter, the unclamping step, the contact step, the adjusting step and the clamping step are carried out in order in substantially the same manner as described in the first embodiment.

As described above, the place AP where the coarse adjustment by the coarse motion adjusting mechanism 50 is carried out in cooperation with the coarse motion adjusting unit 80 is under the next-tool waiting position WP and is in the non-machining area. Since the coarse adjustment of the tool radius can be done in the tool standby area in this way, it is possible to perform the tool radius adjustment on the boring holder 1 in parallel time relation with a machining of a workpiece with a preceding tool attached to the tool spindle 2. That is, the tool radius adjustment for the next tool or boring holder 1 can be done while a machining is being performed with another or preceding tool attached to the tool spindle 2. Accordingly, it is possible to perform the tool radius adjustment without extending a total machining time taken to machine the workpiece.

In the foregoing third embodiment, the coarse adjustment of the tool radius by the coarse motion adjusting mechanism 50 is performed with respect to a next waiting tool. Alternatively, the coarse adjustment of the tool radius by the coarse motion adjusting mechanism 50 may be performed at any place in the tool magazine 105 or at the next-tool waiting position WP itself. Although the foregoing third embodiment has been described using the boring holder 1 described in detail in the forgoing first embodiment, it is of course possible to use the tool holder 1 with the coarse motion adjusting mechanism 90 described in the foregoing second embodiment in practicing the coarse adjustment of the tool radius in the foregoing third embodiment.

Various features and many of the attendant advantages in the foregoing embodiments will be summarized as follows:

In the tool radius adjusting system in each of the foregoing first and second embodiments typically shown in FIGS. 1-3 and 14-15, it is possible to reliably perform an automatic compensation with respect to the boring holder 1 having two adjusting mechanisms including the fine motion adjusting mechanism 20 and the coarse motion adjusting mechanism 50 (90). The fine and coarse motion adjusting mechanisms 20, 50 (90) differ from each other in adjusting amount, wherein the adjusting amount by the coarse motion adjusting mechanism 50 (90) is set to be larger than the adjusting amount by the fine motion adjusting mechanism 20.

Also in the adjusting system in each of the foregoing first and second embodiments typically shown in FIGS. 1 and 13, the controller 108 may determine one or both of the fine and coarse motion adjusting mechanism 20, 50 (90) to be operated, based on the compensation amount and may bring the tool radius into agreement with the target tool radius by operating the determined one or both of the adjusting mechanisms 20, 50 (90). Thus, it is possible to determine based on the compensation amount whether either one of the fine and coarse motion adjusting mechanisms 20, 50 (90) is to be operated or whether both of the mechanisms 20, 50 (90) are to be operated. Thus, it becomes possible to perform an appropriate operation based on the compensation amount.

Figure 16:
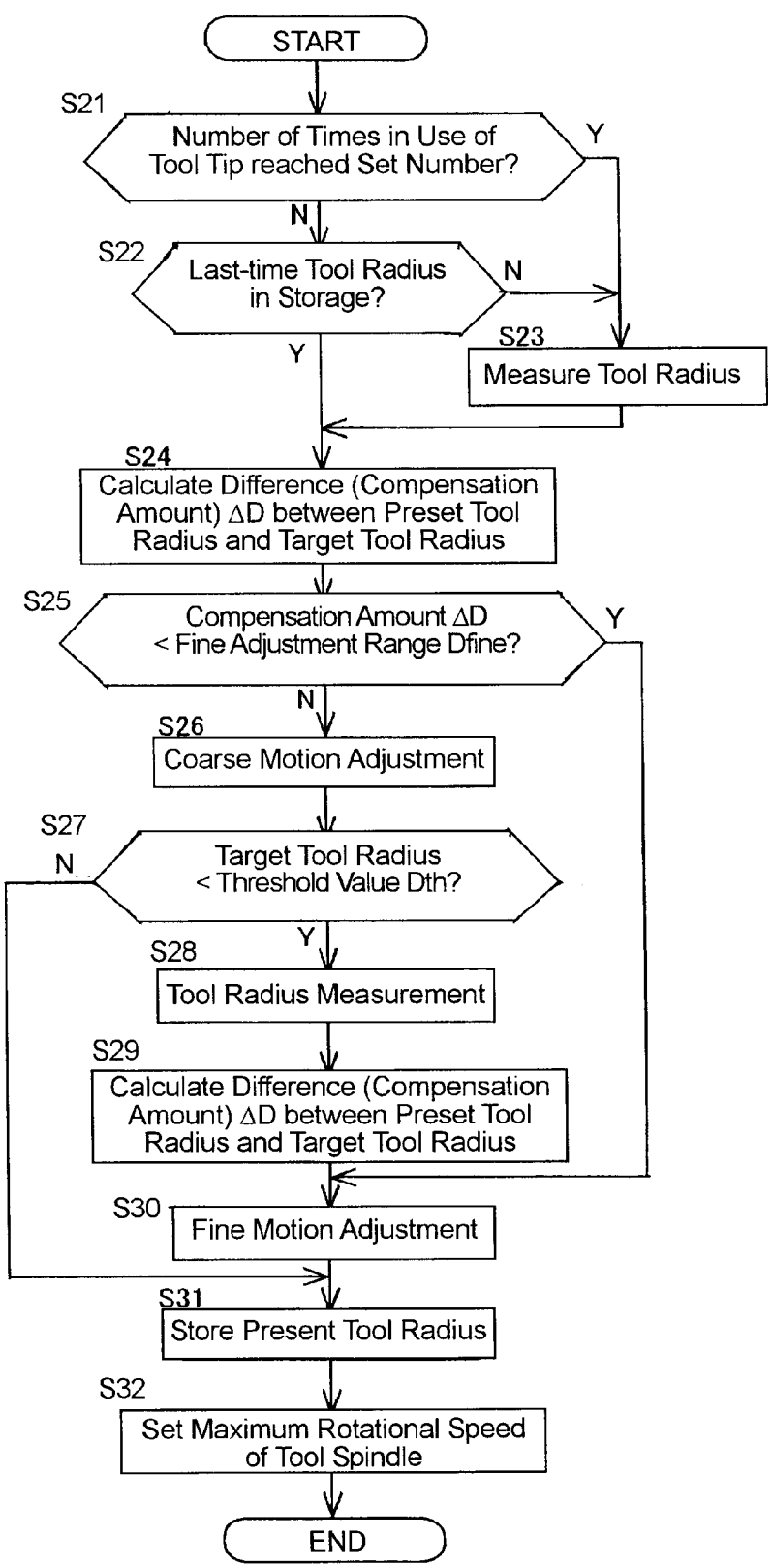
FIG. 16 is a flow chart of an automatic tool radius adjusting processing in the second embodiment.

Also in each of the foregoing first and second embodiments typically shown in FIGS. 1, 13 and 16, the tool radius adjusting system is provided with the last-time tool radius storage means (i.e., the memory device) 108*a* for storing as last-time tool radius the tool radius of the boring holder 1 which was measured at the last time, and the controller 108 calculates the difference between the last-time tool radius being stored in the last-time tool radius storage means 108*a* and the target tool radius. Since the last-time tool radius is utilized, it is not required to measure the tool radius each time the tool radius is to be compensated. Therefore, the time taken to compensate the tool radius can be shortened.

Figure 14:
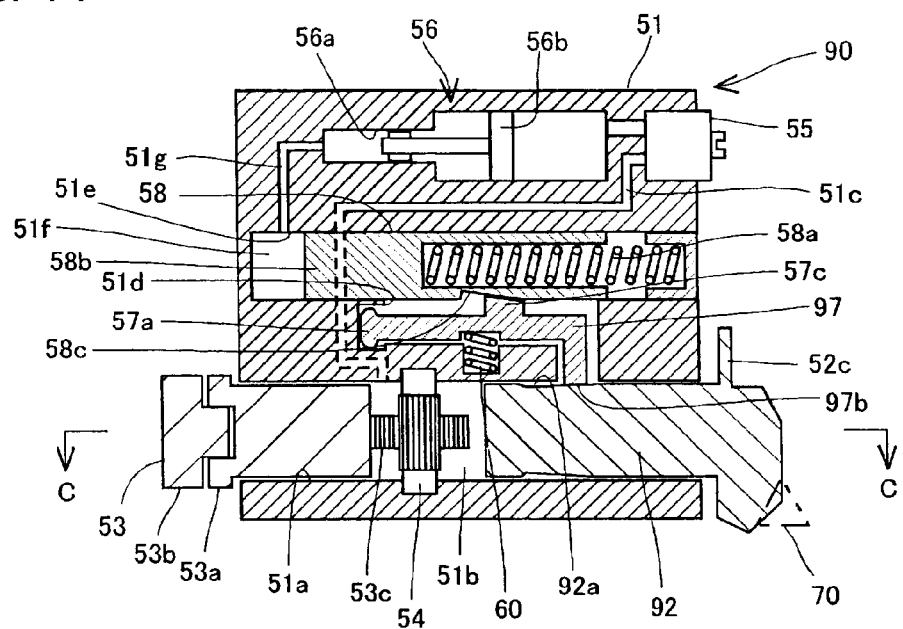
FIG. 14 is an enlarged longitudinal sectional view of a coarse motion adjusting mechanism in a second embodiment according to the present invention.
Figure 15:
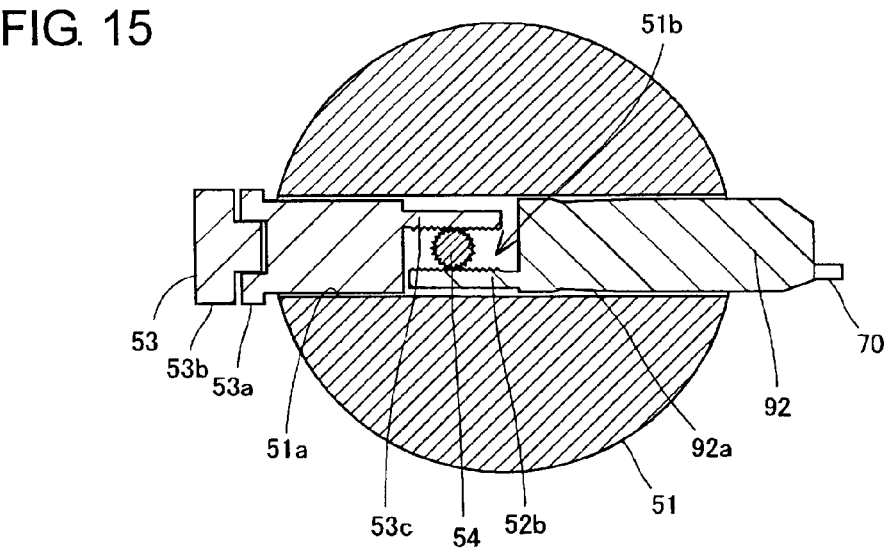
FIG. 15 is a cross-sectional view taken along the line C-C in FIG. 14.

In the adjusting system in the foregoing second embodiment typically shown in FIGS. 14 and 16, the controller 108 is configured to operate the coarse motion adjusting mechanism 90 only where the target tool radius is larger than a set threshold value Dth but to operate at least the fine motion adjusting mechanism where the target tool radius is equal to or smaller than the set threshold value Dth. Generally, a machining allowance is large where a bore diameter to be machined is large, but is small where the bore diameter is small. Thus, the adjustment is performed by operating the fine motion adjusting mechanism 20 necessarily where the bore diameter to be machined is small, but by operating the coarse motion adjusting mechanism only where the bore diameter is large. Therefore, it is possible to operate the adjusting mechanisms 20, 90 appropriately in dependence on the bore diameter to be machined.

Also in the adjusting system in each of the foregoing first and second embodiments typically shown in FIGS. 13 and 16, the controller 108 is configured to set a maximum rotational speed of the tool spindle 2 in dependence on the tool radius of the boring holder 1 in machining a workpiece with the boring holder 1. Therefore, a restriction is appropriately imposed on the rotational speed of the tool spindle 2 in dependence on the tool radius of the boring holder 1. For example, the larger the tool radius of the boring holder 1 is, the slower the maximum rotational speed of the tool spindle 2 is set to. The phrase "in dependence on the tool radius of the boring holder" herein encompasses a case of "in dependence on a maximum tool radius of each boring holder" and another case of "in dependence on a present tool radius of the boring holder".

In the tool radius adjusting method in the foregoing third embodiment typically shown in FIGS. 17, 18 and 5-9, in the contact step, a reference state (FIG. 7) is first established in which the position of the tool tip 70 is set to the predetermined position in the direction to go away from the rotational axis and in which the reference portion 52*c* of the movable body 52, 92 is in contact with the position adjusting reference member 83, and from the reference state, the relative position between the holder support 212 and the position adjusting reference member 83 is changed in the direction to come close to each other (FIG. 8). Thus, the position of the tool tip 70 relative to the rotational axis is adjusted by moving the position of the tool tip 70 to come close to the rotational axis. In order to establish the reference state, the movable body 52, 92 is provided with the reference portion 52*c*, and the position adjusting reference member 83 is further provided. In the method described above, it is possible to adjust the tool radius of the boring holder 1 automatically.

Further, the adjustment of the tool radius is performed at the non-machining area including the next-tool waiting position WP and the coarse adjusting position AP. The non-machining area covers the place where the tool magazine 105 and the tool exchange device 106 are provided. Since the adjustment of the tool radius can be performed in the non-machining area, it is possible to machine a workpiece with another tool attached to the tool spindle 2 while the tool radius is being performed on the boring holder 1. In other words, it becomes possible to perform the tool radius adjustment of the boring holder 1 being a next tool while a machining is being performed with another or preceding tool attached to the tool spindle 2. Accordingly, the tool radius adjustment of the boring holder 1 can be done without extending the total period of time taken to machine a workpiece with a plurality of tools including the boring holder 1.

Also in the tool radius adjusting method in the foregoing third embodiment typically shown in FIGS. 7 and 8, the movable body 52, 92 is slidden relative to the housing 51 to move the position of the tool tip 70 in the direction to go away from the rotational axis by being supplied with fluid, and the contact step includes sliding the movable body 52, 92 relative to the housing 51 to place the position of the tool tip 70 to the predetermined position in the direction to go away from the rotational axis by being supplied with the fluid. That is, the position of the tool tip 70 is set to the predetermined position in the direction to go away from the rotational axis by utilizing the fluid supplied from the fluid supply device 81. Therefore, the contact step can be realized easily.

Also in the tool radius adjusting method in the foregoing third embodiment typically shown in FIGS. 7 and 8, the fluid is air, a clearance is formed between the movable body 52, 92 and the housing 51, and the adjusting step includes exhausting the fluid which is supplied for sliding the movable body 52, 92 relative to the housing 51 in the direction to make the position of the tool tip 70 go away from the rotational axis in adjusting the position of the tool tip 70 relative to the rotational axis. Thus, the fluid supplied at the contact step and the adjusting step is exhausted through the clearance formed between the movable body 52, 92 and the housing 51. Therefore, there can be attained an air purge function of preventing chips, dusts and the like from entering the housing 51.

Also in the tool radius adjusting method in the foregoing third embodiment typically shown in FIGS. 5, 17 and 18, the housing 51 is provided with the fluid receiving port 55 for being supplied from an outside with the fluid used in sliding the movable body 52, 92, and the machine tool 200 is provided with the coarse motion adjusting unit 80 having the position adjusting reference member 83 and the fluid supply device 81 for supplying the fluid to the fluid receiving port 55. Further, the tool radius adjusting method further comprises the coupling step (FIG. 5) of coupling the fluid receiving port 55 of the housing 51 to the fluid supply device 81 prior to the contact step. Thus, it is possible to adjust the tool radius of the boring holder 1 reliably though the fluid supply device 81 is provided as a separate device being independent of the boring holder 1 composed of the housing 51, the movable body 52, 92 and the tool tip 70.

Further, the machine tool 200 in the foregoing third embodiment shown in FIG. 17 can attain substantially the same effects as those in the foregoing tool radius adjusting method. Other features in the tool radius adjusting method are likewise applicable to the machine tool 200, and therefore, the machine tool 200 can attain substantially the same effects as those in the foregoing tool radius adjusting method.

Obviously, further numerous modifications and variations of the present invention are possible in light of the above teachings. It is therefore to be understood that within the scope of the appended claims, the present invention may be practiced otherwise than as specifically described herein.

What is claimed is:

1. A tool radius adjusting method in a machine tool comprising:
a boring holder provided with a housing and a movable body supported in the housing slidably relative to the housing in a direction intersecting a rotational axis of the boring holder, the movable body having a reference portion;
a tool tip attached to the movable body;
a holder support for supporting the boring holder in a tool standby area which is out of a machining area of the machine tool;
a position adjusting reference member provided in the tool standby area and being contactable with the reference portion of the movable body; and
a drive mechanism for effecting relative movement between the holder support and the position adjusting reference member;
the method comprising:
a contact step of sliding the movable body relative to the housing to place the position of the tool tip at a predetermined position in a direction to go away from the rotational axis and of operating the drive mechanism to bring the reference portion of the movable body into contact with the position adjusting reference member with the tool tip placed at the predetermined position relative to the housing; and
an adjusting step of adjusting the position of the tool tip relative to the rotational axis by moving the relative position between the housing and the position adjusting reference member in a direction to come close to each other after the contact step;
wherein all of the steps are performed in the tool standby area.

2. The method as set forth in claim 1, wherein:
the movable body is slidden relative to the housing to move the position of the tool tip in the direction to go away from the rotational axis by being supplied with fluid; and
the contact step includes sliding the movable body relative to the housing to place the position of the tool tip to the predetermined position in the direction to go away from the rotational axis by being supplied with the fluid.

3. The method as set forth in claim 2, wherein:
the fluid is air;
a clearance is formed between the movable body and the housing; and
the adjusting step includes exhausting the fluid which is supplied for sliding the movable body relative to the housing in the direction to make the position of the tool tip go away from the rotational axis in adjusting the position of the tool tip relative to the rotational axis.

4. The method as set forth in claim 2, wherein:
the housing is provided with a fluid receiving port for being supplied from an outside with the fluid used in sliding the movable body; and
the machine tool is provided with an adjusting unit having the position adjusting reference member and a fluid supply device for supplying the fluid to the fluid receiving port;
the method further comprising:
a coupling step of coupling the fluid receiving port of the housing to the fluid supply device prior to the contact step.

5. A machine tool comprising:
a boring holder provided with a housing and a movable body supported in the housing slidably in a direction intersecting a rotational axis of the boring holder, the movable body having a reference portion;
a tool tip attached to the movable body;
a holder support provided in a tool standby area where a tool in a state of being not attached to a tool spindle is on standby, for supporting the boring holder;
a position adjusting reference member provided in the tool standby area and being contactable with the reference portion of the movable body;
a drive mechanism provided in the tool standby area and being able to change the relative position between the holder support and the position adjusting reference member; and
a controller for controlling the drive mechanism to control the relative position between the holder support and the position adjusting reference member;
wherein the controller is configured to adjust the position of the tool tip relative to the rotational axis by controlling the drive mechanism to change the relative position between the holder support and the position adjusting reference member in a direction to come close to each other in the state that the position of the tool tip is placed to a predetermined position in a direction to go away from the rotational axis and that the reference portion of the movable body is in contact with the position adjusting reference member.

* * * * *